US010824876B2

(12) United States Patent
Matsumoto et al.

(10) Patent No.: US 10,824,876 B2
(45) Date of Patent: Nov. 3, 2020

(54) PILOTLESS FLYING OBJECT DETECTION SYSTEM AND PILOTLESS FLYING OBJECT DETECTION METHOD

(71) Applicant: PANASONIC INTELLECTUAL PROPERTY MANAGEMENT CO., LTD., Osaka (JP)

(72) Inventors: Hiroyuki Matsumoto, Fukuoka (JP); Shintaro Yoshikuni, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 32 days.

(21) Appl. No.: 15/338,814

(22) Filed: Oct. 31, 2016

(65) Prior Publication Data

US 2017/0132474 A1    May 11, 2017

(30) Foreign Application Priority Data

Nov. 6, 2015 (JP) ................................ 2015-218726

(51) Int. Cl.
*G06T 7/73* (2017.01)
*H04N 5/272* (2006.01)
(Continued)

(52) U.S. Cl.
CPC ..... *G06K 9/00771* (2013.01); *G06K 9/00664* (2013.01); *G06T 7/74* (2017.01);
(Continued)

(58) Field of Classification Search
None
See application file for complete search history.

(56) References Cited

U.S. PATENT DOCUMENTS

2011/0243543 A1* 10/2011 Pace ................. G03B 35/08
396/325
2014/0376740 A1 12/2014 Shigenaga et al.
(Continued)

FOREIGN PATENT DOCUMENTS

CN    1968405 A    5/2007
JP    8-007199 A    1/1996
(Continued)

OTHER PUBLICATIONS

O'Donovan A, Duraiswami R, Zotkin D. Imaging concert hall acoustics using visual and audio cameras. InAcoustics, Speech and Signal Processing, 2008. ICASSP 2008. IEEE International Conference on Mar. 31, 2008 (pp. 5284-5287). IEEE. (Year: 2008).*
(Continued)

*Primary Examiner* — Clifford Hilaire
(74) *Attorney, Agent, or Firm* — Greenblum & Bernstein, P.L.C.

(57) ABSTRACT

In an object, for example, a pilotless flying object detection system, an omnidirectional camera as a first camera images a monitoring area. A microphone array acquires audio of the monitoring area. A monitoring apparatus uses the audio data acquired by the microphone array to detect a pilotless flying object which appears in the monitoring area. A signal processor in the monitoring apparatus superimposes a discrimination mark, obtained by converting the pilotless flying object into visual information, on image data of the monitoring area when displaying the image data of the monitoring area captured by the omnidirectional camera on a monitor.

23 Claims, 14 Drawing Sheets

(51) Int. Cl.
*G06K 9/00* (2006.01)
*H04N 7/18* (2006.01)
*G08G 5/00* (2006.01)
*H04R 1/02* (2006.01)
*H04R 3/00* (2006.01)
*H04N 5/232* (2006.01)
*H04N 5/247* (2006.01)

(52) U.S. Cl.
CPC ....... *G08G 5/0082* (2013.01); *H04N 5/23293* (2013.01); *H04N 5/23296* (2013.01); *H04N 5/247* (2013.01); *H04N 5/272* (2013.01); *H04N 7/181* (2013.01); *H04R 1/028* (2013.01); *H04R 3/005* (2013.01); *H04R 2499/13* (2013.01)

(56) References Cited

U.S. PATENT DOCUMENTS

| | | | | |
|---|---|---|---|---|
| 2015/0016641 | A1* | 1/2015 | Ugur | G10L 21/0216 381/303 |
| 2016/0065820 | A1* | 3/2016 | Yamamoto | H04N 5/2351 348/151 |
| 2016/0142620 | A1 | 5/2016 | Sawa et al. | |
| 2016/0277863 | A1* | 9/2016 | Cahill | H04R 3/005 |

FOREIGN PATENT DOCUMENTS

| | | |
|---|---|---|
| JP | 9-101197 A | 4/1997 |
| JP | 2003-189273 A | 7/2003 |
| JP | 2004-077277 A | 3/2004 |
| JP | 2006-168421 | 6/2006 |
| JP | 2010-232888 A | 10/2010 |
| JP | 2012-129873 A | 7/2012 |
| JP | 2013-106298 A | 5/2013 |
| JP | 2013-240000 A | 11/2013 |
| JP | 2014-212443 A | 11/2014 |
| JP | 2015-029241 | 2/2015 |
| JP | 5939341 B1 | 6/2016 |
| JP | 5979458 B1 | 8/2016 |
| JP | 2017-092938 A | 5/2017 |
| WO | 2014/125835 A1 | 8/2014 |
| WO | 2015/162645 A1 | 10/2015 |

OTHER PUBLICATIONS

Case EE, Zelnio AM, Rigling BD. Low-cost acoustic array for small UAV detection and tracking. InAerospace and Electronics Conference, 2008. NAECON 2008. IEEE National Jul. 16, 2008 (pp. 110-113). IEEE. (Year: 2008).*

International Search Report of PCT application No. PCT/JP2016/004793 dated Jan. 17, 2017.

Busset Joel et al: "Detection and tracking of drones using advanced acoustic cameras", Visual Communications and Image Processing; Jan. 20, 2004-Jan. 20, 2004; San Jose, vol. 9647, Oct. 13, 2015 (Oct. 13, 2015), pp. 96470F-1-96470F-8, XP060062661.

English Translation of Chinese Search Report dated Dec. 31, 2019 from State Intellectual Property Office (SIPO) of the People's Republic of China for the related Chinese Patent Application No. 201680062295.2.

* cited by examiner

PILOTLESS FLYING OBJECT DETECTION SYSTEM AND PILOTLESS FLYING OBJECT DETECTION METHOD

BACKGROUND

1. Technical Field

The present disclosure relates to a pilotless flying object detection system and a pilotless flying object detection method for detecting a pilotless flying object.

2. Description of the Related Art

A flying object monitoring apparatus depicted in Japanese Patent Unexamined Publication No. 2006-168421 is capable of detecting the presence of an object and the flight direction of the object using a plurality of audio detectors which detect sounds generated in a monitoring area on a per-direction basis. If a processor of the flying object monitoring apparatus detects the flight and the flight direction of a flying object through audio detection using microphones, the processor causes a monitoring camera to face the direction in which the flying object flies. Furthermore, the processor displays a video captured by the monitoring camera on a display device.

However, even if a user views the flying object displayed on the display device, the user may be unable to easily determine whether or not the flying object is a pilotless flying object which is a target of the user. For example, various flying objects other than the pilotless flying object which is the target of the user may be visible in the video captured by the monitoring camera. In this case, it is difficult to easily ascertain whether the pilotless flying object which is the target of the user is present, or, even if the pilotless flying object is present, it is difficult to easily ascertain the position of the pilotless flying object from the peripheral state.

SUMMARY

An object of the disclosure is to easily determine the presence and position of a pilotless flying object which is a target of a user using an image captured by a camera. A pilotless flying object detection system of the disclosure includes an omnidirectional camera which images an imaging area; a microphone array which acquires audio of the imaging area; a display unit which displays a captured image of the imaging area captured by the omnidirectional camera; and a signal processor which uses the audio acquired by the microphone array to detect a desired pilotless flying object which appears in the imaging area, in which the signal processor superimposes first identification information obtained by converting the pilotless flying object into visual information in the captured image of the imaging area on the captured image of the imaging area and displays the result on the display unit. A pilotless flying object detection method in a pilotless flying object detection system of the disclosure includes imaging an imaging area using an omnidirectional camera, acquiring audio of the imaging area using a microphone array, using the audio acquired by the microphone array to detect a pilotless flying object which appears in the imaging area, converting the pilotless flying object into visual information in the captured image of the imaging area to generate first identification information, and superimposing the first identification information on the captured image of the imaging area and displays the result on a display unit. According to the disclosure, it is possible to easily determine the presence and position of the pilotless flying object which is the target of the user using an image captured by a camera.

DETAILED DESCRIPTION

Hereinafter, detailed description will be given of an embodiment (hereinafter referred to as the "exemplary embodiment") which specifically discloses a pilotless flying object detection system and a pilotless flying object detection method according to the disclosure, with reference to the diagrams, as appropriate. Description in greater detail than is necessary may be omitted. For example, detailed description of matters already well known, and duplicate description of configurations which are effectively the same may be omitted. This is in order to avoid rendering the following description unnecessarily verbose, and to facilitate understanding of a person skilled in the art. The attached diagrams and the following description are provided in order for a person skilled in the art to sufficiently understand the disclosure, and are not intended to limit the scope of the claims.

Figure 1:
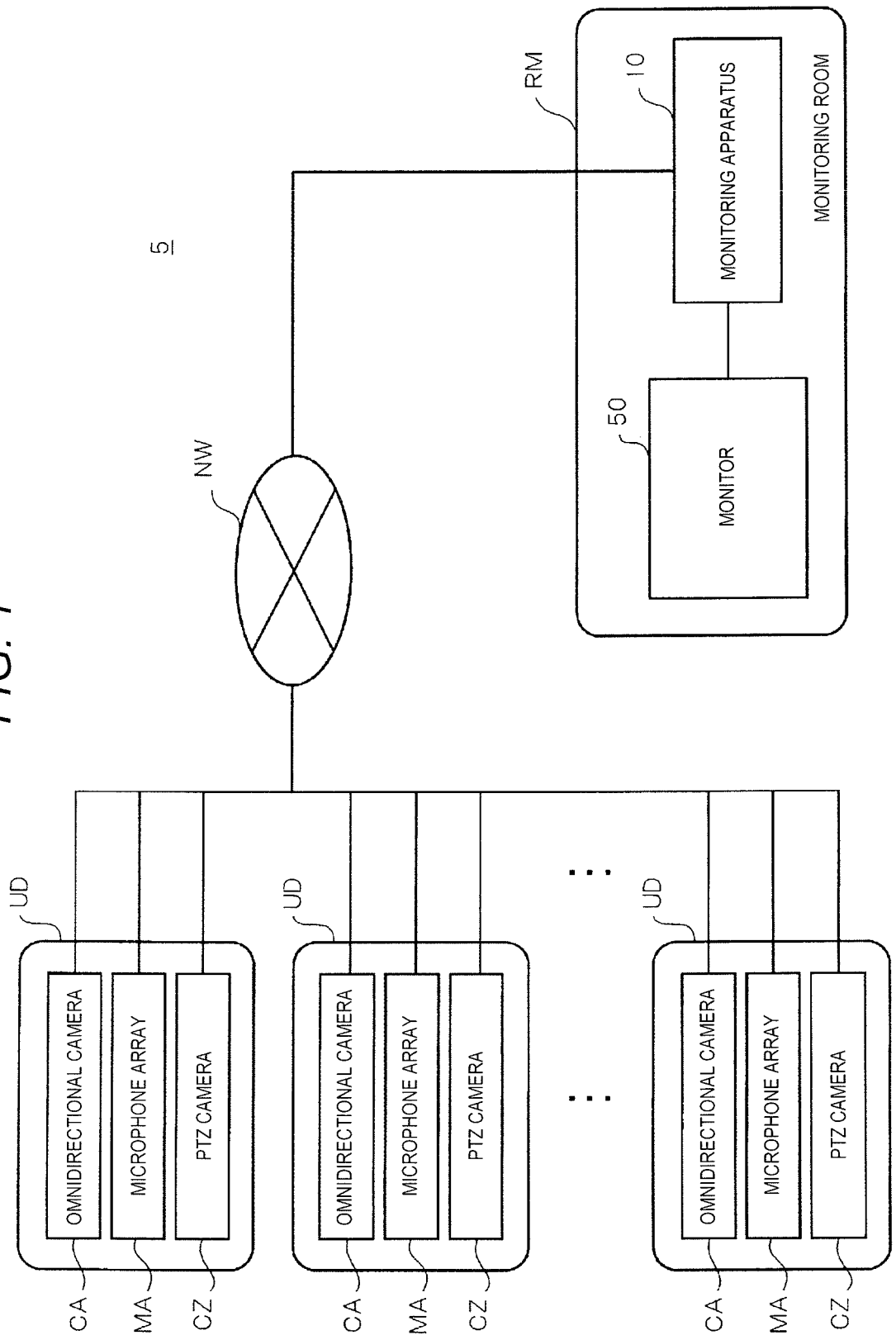
FIG. 1 is a diagram illustrating an example of the schematic configuration of a pilotless flying object detection system of the exemplary embodiment.

FIG. 1 is a diagram illustrating an example of the schematic configuration of pilotless flying object detection system 5 of the exemplary embodiment. Pilotless flying object detection system 5 detects pilotless flying object dn (for example, refer to FIG. 14) which is a target of the user as a detection target. Pilotless flying object dn is a drone which flies autonomously using a global positioning system (GPS) function for example, a radio controlled helicopter wirelessly controlled by a third party, or the like. Pilotless flying object dn is used in aerial photography of a target, delivery of goods, or the like, for example.

In the exemplary embodiment, a multi-copter drone on which a plurality of rotors (in other words, rotary blades) are installed is exemplified as pilotless flying object dn. In a multi-copter drone, generally, when there are two rotor blades, a high frequency wave of twice the frequency of a specific frequency, and further, a high frequency wave of a multiple frequency thereof are generated. Similarly, when there are three rotor blades, a high frequency wave of three times the frequency of a specific frequency, and further, a high frequency wave of a multiple frequency thereof are generated. The same applies to a case in which the number of rotor blades is greater than or equal to four.

Pilotless flying object detection system 5 is configured to include a plurality of sound source detectors UD, monitoring apparatus 10, and monitor 50. The plurality of sound source detectors UD is mutually connected to monitoring apparatus 10 via network NW. Each sound source detector UD includes microphone array MA, omnidirectional camera CA, and pan tilt zoom (PTZ) camera CZ. Except for cases in which it is necessary to particularly distinguish the individual sound source detectors, these will be referred to as sound source detector UD. Similarly, except for cases in which it is necessary to particularly distinguish the individual microphone arrays, omnidirectional cameras, and PTZ cameras, these will be referred to as microphone array MA, omnidirectional camera CA, and PTZ camera CZ.

In sound source detector UD, microphone array MA acquires sound of all directions in a sound acquisition area in which the device is installed in a non-directional state. Microphone array MA includes body 15 (refer to FIG. 2) in the center of which a cylindrical opening of a predetermined width is formed. Examples of sounds used as sound acquisition targets of microphone array MA include mechanical operating sound of a drone or the like, vocalizations uttered by a human or the like, and a wide variety of other sounds, including not only sounds of an audible frequency (that is, 20 Hz to 23 kHz) domain, but also low frequency sounds which are lower than audible frequencies and ultrasonic sounds which exceed audible frequencies.

Figure 3:
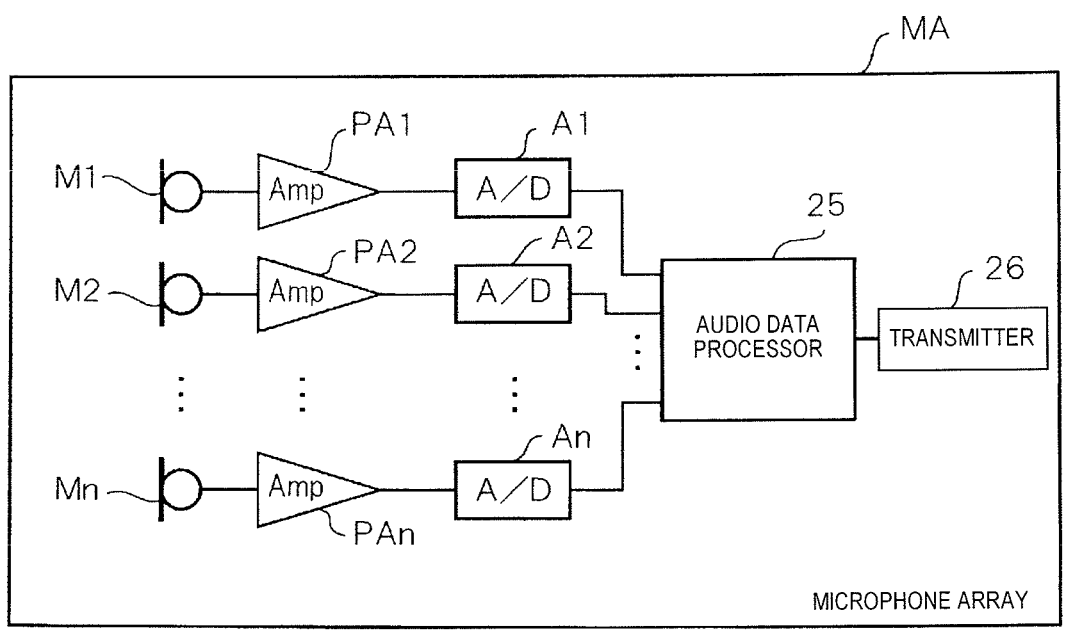
FIG. 3 is a block diagram illustrating an example of the internal configuration of a microphone array, in detail.

Microphone array MA includes a plurality of non-directional microphones M1 to Mn (refer to FIG. 3). Microphones M1 to Mn are disposed at a predetermined interval (for example, a uniform interval) in a coaxial circular shape along a circumferential direction around the opening which is provided in body 15 (in other words, at a predetermined interval on an imaginary circular around the same location as the center of the opening). Electret Condenser Microphones (ECM) are used for the microphones, for example. Microphone array MA transmits audio data of the audio (refer to later description) obtained through the sound acquisition of microphones M1 to Mn to monitoring apparatus 10 via network NW. The arrangement of microphones M1 to Mn described above is an example, and other arrangements may be adopted.

Microphone array MA includes a plurality of microphones M1 to Mn (for example, n=32), and a plurality of amplifiers PA1 to PAn (refer to FIG. 3) which amplify the output signals of the plurality of microphones M1 to Mn, respectively. The analog signals which are output from each amplifier are converted to corresponding digital signals by A/D converters A1 to An which are described later (refer to FIG. 3). The number of microphones in the microphone array is not limited to 32, and may be another number (for example, 16, 64, or 128).

Omnidirectional camera CA which has approximately the same volume as the opening is housed inside the opening formed in the middle of body 15 (refer to FIG. 2) of microphone array MA. In other words, microphone array MA and omnidirectional camera CA are disposed integrally (refer to FIG. 2). Omnidirectional camera CA is a camera on which a fish-eye lens, capable of capturing an omnidirectional image of the imaging area which is the sound acquisition area, is mounted. In the exemplary embodiment, description is given assuming that the sound acquisition area and the imaging area are a shared monitoring area; however, the spatial sizes (for example, volume) of the sound acquisition area and the imaging area may not be the same. For example, the volume of the sound acquisition area may be larger or smaller than the volume of the imaging area. In other words, it is sufficient for the sound acquisition area and the imaging area to have a shared volume portion. Omnidirectional camera CA functions as a monitoring camera capable of imaging the imaging area in which sound source detector UD is installed, for example. In other words, omnidirectional camera CA has an angle of view of 180° in the vertical direction and 360° in the horizontal direction, and images monitoring area 8 (refer to FIG. 11) which is a hemisphere, for example, as the imaging area.

In each sound source detector UD, omnidirectional camera CA and microphone array MA are disposed coaxially due to omnidirectional camera CA being fitted inside the opening of body 15. In this manner, due to the optical axis of omnidirectional camera CA and the center axis of the body of microphone array MA matching, the imaging area and the sound acquisition area match substantially in the axial circumference direction (that is, the horizontal direction), and it becomes possible to express the position of an object in the image and the position of a sound source of a sound acquisition target in the same coordinate system (for example, coordinates indicated by (horizontal angle, vertical angle)). Each sound source detector UD is attached such that upward in the vertical direction becomes a sound acquisition surface and an imaging surface, for example, in order to detect pilotless flying object do which flies from the sky (refer to FIG. 2).

Monitoring apparatus 10 is capable of forming directionality (that is, beam forming) in relation to the sound of all directions acquired by microphone array MA using an arbitrary direction as a main beam direction based on a user operation, and emphasizing the sound of the directivity setting direction.

Monitoring apparatus 10 uses the image (hereinafter, this may be shortened to "captured image") captured by omnidirectional camera CA and processes the captured image to generate an omnidirectional image. The omnidirectional image may be generated by omnidirectional camera CA instead of monitoring apparatus 10.

Monitoring apparatus 10 outputs various images to monitor 50 or the like to display the images using an image (refer to FIG. 15) based on a calculated value of the sound pressure of the sound acquired by microphone array MA, and an image based on the captured image captured by omnidirectional camera CA. For example, monitoring apparatus 10 displays omnidirectional image GZ1 and discrimination mark mk (refer to FIG. 13) obtained by converting the detected pilotless flying object do into visual information in omnidirectional image GZ1 on monitor 50. Monitoring apparatus 10 is configured using a personal computer (PC) or a server, for example. Visual information means information in omnidirectional image GZ1 represented to an extent which may be clearly distinguished from other objects when the user views omnidirectional image GZ1.

Monitor 50 displays omnidirectional image GZ1 captured by omnidirectional camera CA. Monitor 50 generates a composite image obtained by superimposing discrimination mark mk on omnidirectional image GZ1 and displays the composite image. Monitor 50 may be configured as a device which is integral to monitoring apparatus 10.

In FIG. 1, the plurality of sound source detectors UD and monitoring apparatus 10 have a communication interface, and are interconnected via network NW to be capable of data communication. Network NW may be a wired network (for example, an intranet, the Internet, or a wired local area network (LAN)), and may be a wireless network (for example, a wireless LAN). Sound source detectors UD and monitoring apparatus 10 may be connected directly without connecting via network NW. Monitoring apparatus 10 and monitor 50 are installed in a monitoring room RM in which a user such as a surveillance worker resides.

Figure 2:
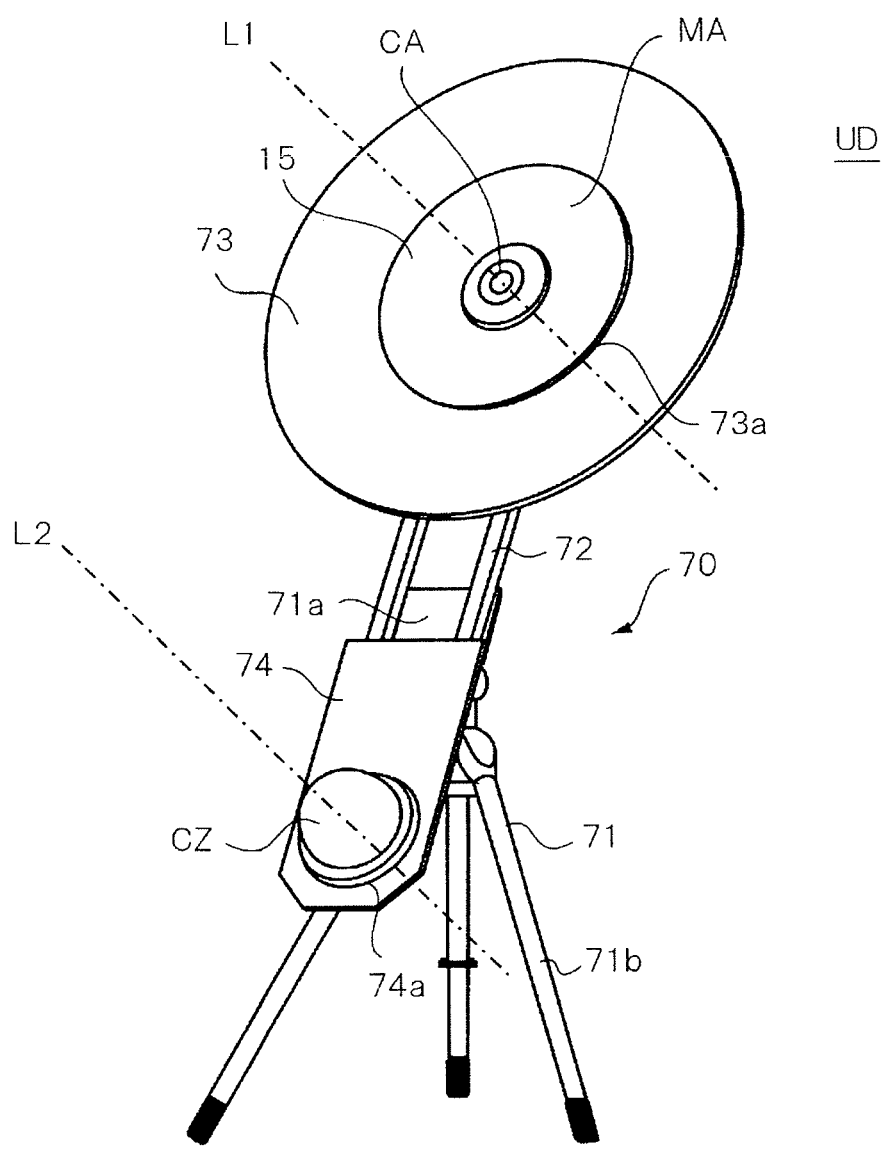
FIG. 2 is a diagram illustrating an example of the external appearance of a sound source detector.

FIG. 2 is a diagram illustrating the external appearance of sound source detector UD. In addition to microphone array MA, omnidirectional camera CA, and PTZ camera CZ described earlier, sound source detector UD includes supporting stand 70 which mechanically supports the earlier-described elements. Supporting stand 70 has a structure combining tripod 71, two rails 72 which are fixed to top board 71a of tripod 71, and first adapter plate 73 and second adapter plate 74 which are attached to the end of each of two rails 72.

First adapter plate 73 and second adapter plate 74 are attached to straddle two rails 72, and have substantially the same planar surfaces. First adapter plate 73 and second adapter plate 74 slide freely on two rails 72, and are fixed adjusted to positions separated from or proximal to each other.

First adapter plate 73 is a disc-shaped plate member. Opening 73a is formed in the center of first adapter plate 73. Body 15 of microphone array MA is housed and fixed in opening 73a. Meanwhile, second adapter plate 74 is a substantially rectangular plate member. Opening 74a is formed in a portion close to the outside of second adapter plate 74. PTZ camera CZ is housed and fixed in opening 74a.

As illustrated in FIG. 2, in the initial installation state, optical axis L1 of omnidirectional camera CA built in body 15 of microphone array MA and optical axis L2 of PTZ camera CZ attached to second adapter plate 74 are set to be parallel to each other.

Tripod 71 is supported on a ground surface by three legs 71b, freely moves the position of top board 71a in the vertical direction in relation to the ground surface through manual operation, and is capable of adjusting the orientation of top board 71a in the pan direction and the tilt direction. Accordingly, it is possible to set the sound acquisition area of microphone array MA (in other words, the imaging area of omnidirectional camera CA) to an arbitrary orientation.

FIG. 3 is a block diagram illustrating an example of the internal configuration of microphone array MA, in detail. Microphone array MA illustrated in FIG. 3 is configured to include a plurality of microphones M1 to Mn (for example, n=32), a plurality of amplifiers PA1 to PAn, a plurality of A/D converters A1 to An, audio data processor 25, and transmitter 26. The plurality of amplifiers PA1 to PAn amplify the corresponding output signals of the plurality of microphones M1 to Mn, and the plurality of A/D converters A1 to An convert the analog signals which are output from amplifiers PA1 to PAn into corresponding digital signals.

Audio data processor 25 generates audio data packets based on the digital audio signals which are output from A/D converters A1 to An. Transmitter 26 transmits the audio data packets which are generated by audio data processor 25 to monitoring apparatus 10 via network NW.

In this manner, microphone array MA amplifies the output signals of microphones M1 to Mn using amplifiers PA1 to PAn, and converts the amplified signals into digital audio signals using A/D converters A1 to An. Subsequently, microphone array MA generates audio data packets using audio data processor 25, and transmits the audio data packets to monitoring apparatus 10 via network NW.

Figure 4:
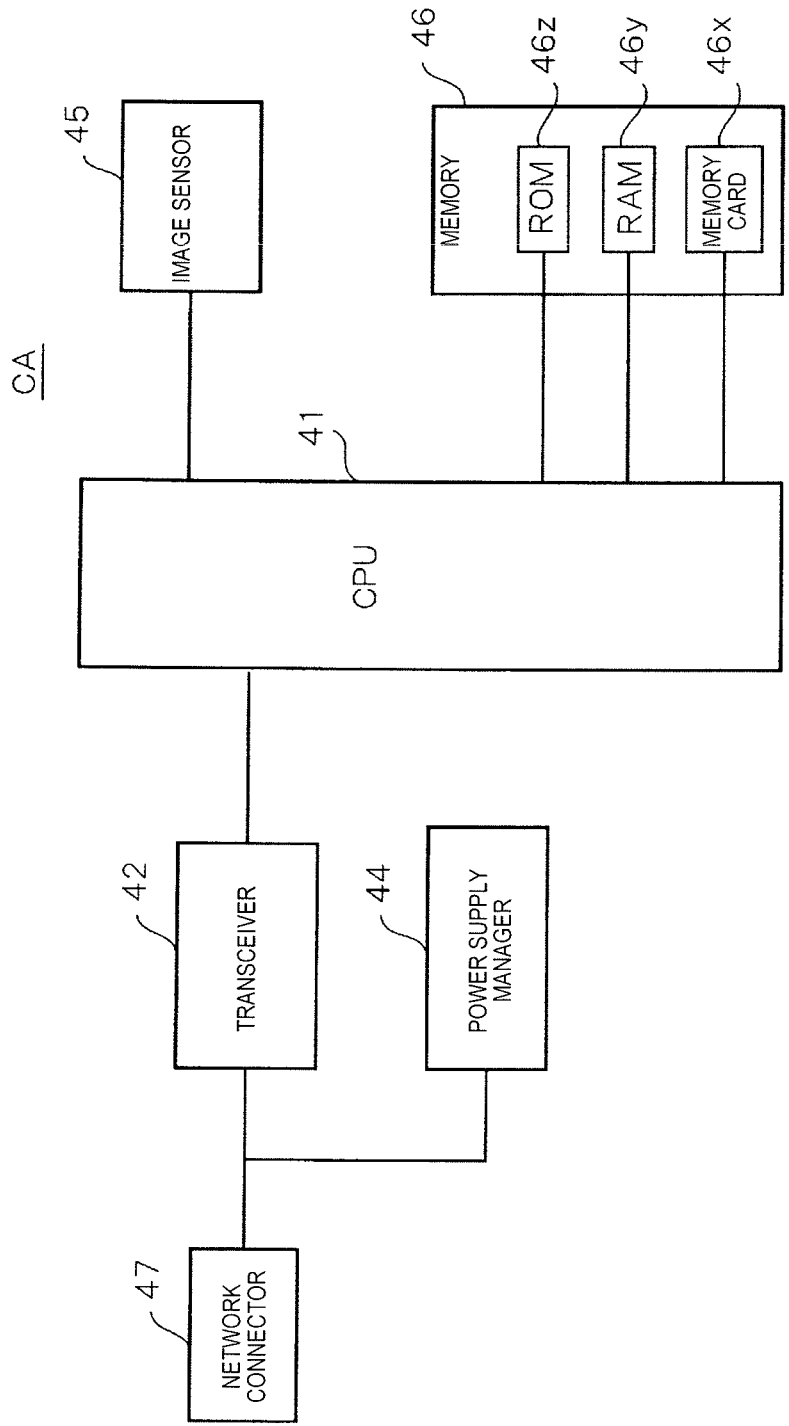
FIG. 4 is a block diagram illustrating an example of the internal configuration of an omnidirectional camera, in detail.

FIG. 4 is a block diagram illustrating an example of the internal configuration of omnidirectional camera CA, in detail. Omnidirectional camera CA illustrated in FIG. 4 is configured to include CPU 41, transceiver 42, power supply manager 44, image sensor 45, memory 46, and network connector 47. A fish-eye lens is provided on the front stage (that is, the right side in FIG. 4) of image sensor 45.

CPU 41 performs signal processing for performing overall control of the operations of the elements of omnidirectional camera CA, input-output processing of data with other elements, computational processing of data, and storage processing of data. Instead of CPU 41, a processor such as a micro processing unit (MPU) or a digital signal processor (DSP) may be provided.

For example, CPU 41 generates cut-out image data obtained by cutting out an image of a specific range (direction) within the omnidirectional image data by the designation of a user operating monitoring apparatus 10, and saves the generated image data in memory 46.

Image sensor 45 is configured using a complementary metal-oxide semiconductor (CMOS) sensor or a charge coupled device (CCD) sensor, and acquires omnidirectional image data by subjecting an optical image of the reflected light from the imaging area in which light is focused by the fish-eye lens to image processing on a light receiving surface.

Memory 46 includes ROM 46z, RAM 46y, and memory card 46x. Programs and setting value data for defining the operations of omnidirectional camera CA are stored in ROM 46z, RAM 46y stores omnidirectional image data or cut-out image data obtained by cutting out a portion range of the omnidirectional image data, and work data, and memory card 46x is connected to omnidirectional camera CA to be freely inserted and removed, and stores various data.

Transceiver 42 is a network interface (I/F) which controls data communication with network NW to which transceiver 42 is connected via network connector 47.

Power supply manager 44 supplies direct current power to the elements of omnidirectional camera CA. Power supply manager 44 may supply direct current power to devices which are connected to network NW via network connector 47.

Network connector 47 is a connector which transmits omnidirectional image data or two-dimensional panorama image data to monitoring apparatus 10 via network NW, and is capable of supplying power via a network cable.

Figure 5:
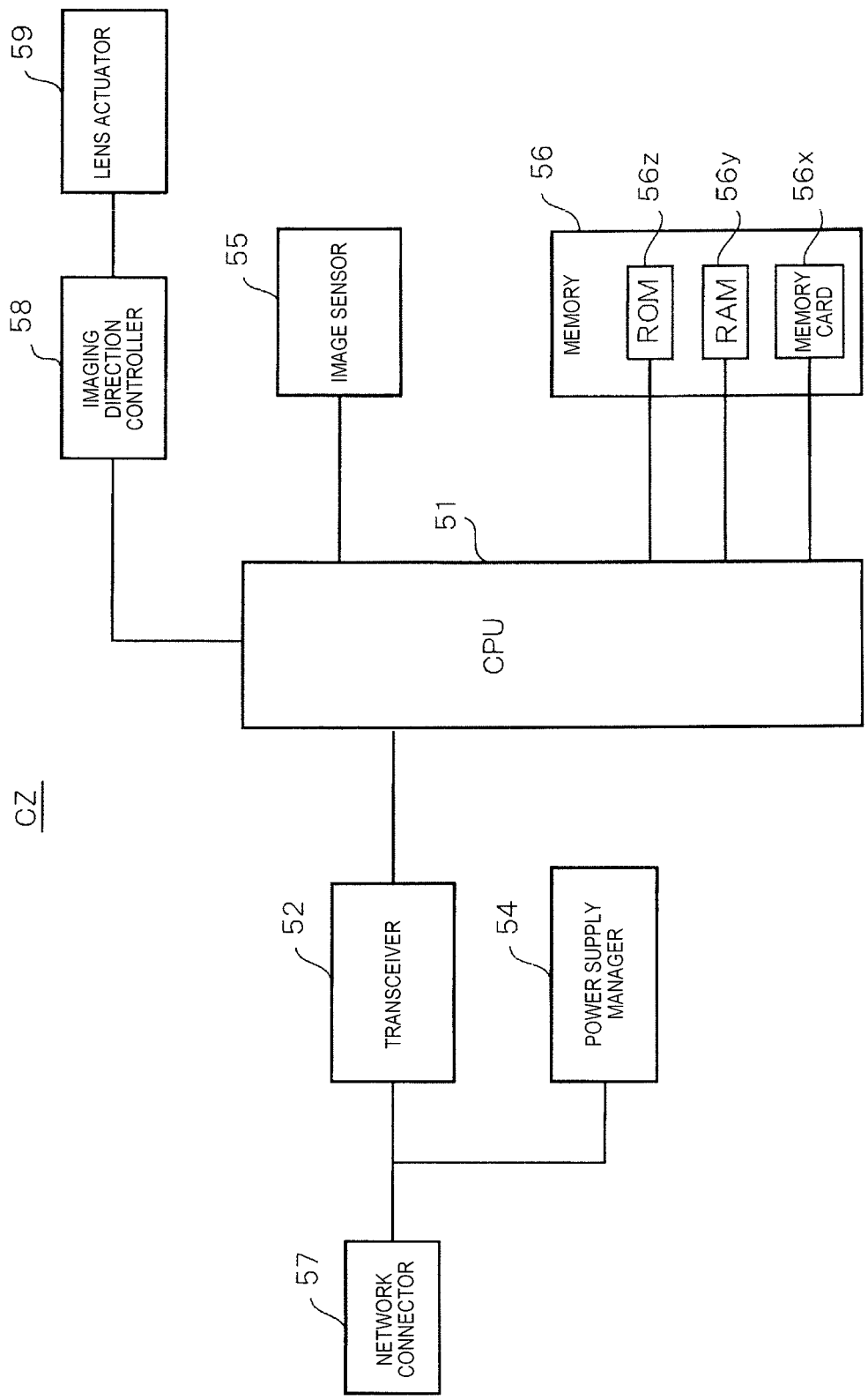
FIG. 5 is a block diagram illustrating an example of the internal configuration of a PTZ camera, in detail.

FIG. 5 is a block diagram illustrating an example of the internal configuration of PTZ camera CZ, in detail. Description of the same elements as in omnidirectional camera CA will be omitted by assigning reference signs corresponding to the elements in FIG. 4. PTZ camera CZ is a camera capable of adjusting the optical axis direction (also referred to as the imaging direction) through angle of view change instructions from monitoring apparatus 10.

In the same manner as omnidirectional camera CA, PTZ camera CZ includes CPU 51, transceiver 52, power supply manager 54, image sensor 55, memory 56, and network connector 57, and additionally includes imaging direction controller 58 and lens actuator 59. If an angle of view change instruction of monitoring apparatus 10 is present, CPU 51 notifies imaging direction controller 58 of the angle of view change instruction.

In accordance with the angle of view change instruction of which imaging direction controller 58 is notified by CPU 51, imaging direction controller 58 controls the imaging direction of PTZ camera CZ in at least one of the pan direction and the tilt direction, and further, as necessary, outputs a control signal for changing the zoom ratio to lens actuator 59. In accordance with the control signal, lens actuator 59 drives the imaging lens, changes the imaging direction of the imaging lens (the direction of optical axis L2), and adjusts the focal length of the imaging lens to change the zoom ratio.

Figure 6:
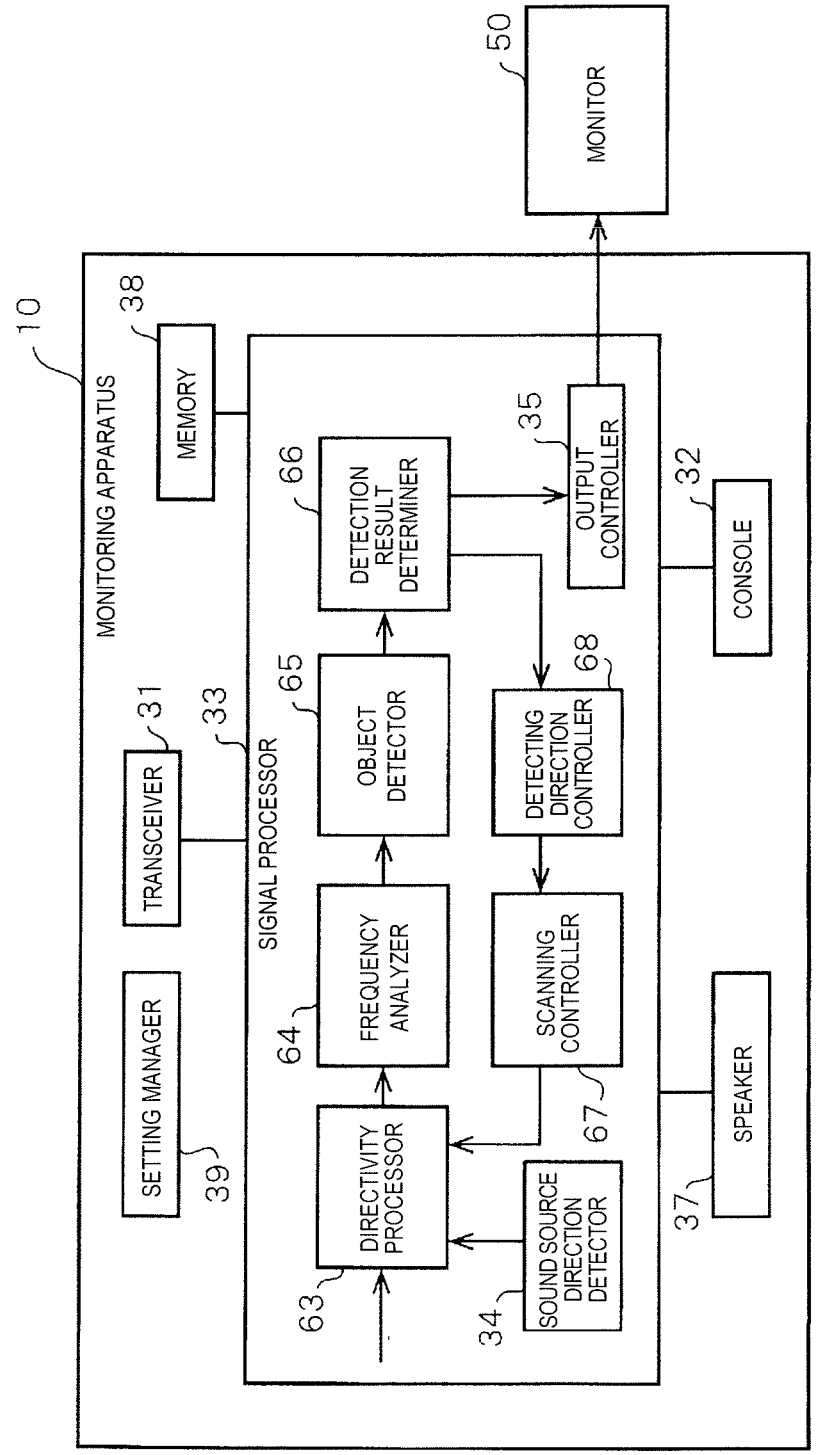
FIG. 6 is a block diagram illustrating an example of the internal configuration of a monitoring apparatus, in detail.

FIG. 6 is a block diagram illustrating an example of the internal configuration of monitoring apparatus 10, in detail. Monitoring apparatus 10 illustrated in FIG. 6 includes at least transceiver 31, console 32, signal processor 33, speaker 37, memory 38, and setting manager 39.

Signal processor 33 is configured using a central processing unit (CPU), a micro processing unit (MPU), or a digital signal processor (DSP), for example, and performs control processing for performing overall control of the operation of the elements of monitoring apparatus 10, input-output processing of data with other elements, computational (calculation) processing of data, and storage processing of data. Signal processor 33 includes directivity processor 63, frequency analyzer 64, object detector 65, detection result determiner 66, scanning controller 67, detecting direction controller 68, sound source direction detector 34, and output controller 35. Monitoring apparatus 10 is connected to monitor 50.

Sound source direction detector 34 estimates the sound source position using the audio data of the audio of monitoring area 8 acquired by microphone array MA according to a well-known cross-power spectrum phase analysis (CSP) method. In the CSP method, when sound source direction detector 34 divides monitoring area 8 illustrated in FIG. 11 into a plurality of blocks and sound is acquired by microphone array MA, sound source direction detector 34 is capable of approximately estimating the sound source position in monitoring area 8 by determining whether or not a sound exceeding a threshold sound pressure, sound volume or the like is present on a per-block basis.

Setting manager 39 includes, in advance, a coordinate transformation equation relating to the coordinates of a position designated by the user in relation to the screen of monitor 50 on which the omnidirectional image data captured by omnidirectional camera CA is displayed. The coordinate transformation equation is an equation for transforming the coordinates (that is, (horizontal angle, vertical angle)) of a user-designated position in the omnidirectional image data into coordinates of a direction viewed from PTZ camera CZ based on a difference in the physical distance between the installation position of omnidirectional camera CA (refer to FIG. 2) and the installation position of PTZ camera CZ (refer to FIG. 2).

Signal processor 33 uses the coordinate transformation equation held by setting manager 39 to calculate the coordinates ($\theta$MAh, $\theta$MAv) indicating the directivity setting direction facing the actual sound source position corresponding to the position designated by the user from the installation position of PTZ camera CZ, using the installation position of PTZ camera CZ (refer to FIG. 2) as a reference. $\theta$MAh is the horizontal angle of a direction facing the actual sound source position corresponding to the position designated by the user, from the perspective of the installation position of PTZ camera CZ. $\theta$MAv is the vertical angle of a direction facing the actual sound source position corresponding to the position designated by the user, from the perspective of the installation position of PTZ camera CZ. As illustrated in FIG. 2, the distance between omnidirectional camera CA and PTZ camera CZ is known, and since optical axes L1 and L2 are parallel to each other, it is possible to realize the calculation process of the coordinate transformation equation using a well-known geometric computation, for example. The sound source position is the actual sound source position corresponding to the position designated from console 32 by an operation of a finger or a stylus pen of the user in relation to the video data displayed on monitor 50.

As illustrated in FIG. 2, omnidirectional camera CA and microphone array MA are both disposed coaxially with the optical axis direction of omnidirectional camera CA and the center axis of the body of microphone array MA in the exemplary embodiment. Therefore, the coordinates of the designated position derived by omnidirectional camera CA according to the designation of the user in relation to monitor 50 on which the omnidirectional image data is displayed may be treated as the same as the emphasized direction (also referred to as the directivity setting direction) of the sound from the perspective of microphone array MA. In other words, when user designation in relation to monitor 50 on which the omnidirectional image data is displayed is present, monitoring apparatus 10 transmits the coordinates of the designated position in the omnidirectional image data to omnidirectional camera CA. Accordingly, omnidirectional camera CA calculates the coordinates (horizontal angle, vertical angle) indicating the direction of the sound source position corresponding to the designated position from the perspective of omnidirectional camera CA using the coordinates of the designated position which are transmitted from monitoring apparatus 10. The calculation process in omnidirectional camera CA is well-known technology, and thus description thereof will be omitted. Omnidirectional camera CA transmits the calculation results of the coordinates indicating the direction of the sound source position to monitoring apparatus 10. Monitoring apparatus 10 is capable of using the coordinates (horizontal angle, vertical angle) which are calculated by omnidirectional camera CA as the coordinates (horizontal angle, vertical angle) indicating the direction of the sound source position from the perspective of microphone array MA.

However, when omnidirectional camera CA and microphone array MA are not disposed coaxially, it is necessary for setting manager 39 to follow the method described in Japanese Patent Unexamined Publication No. 2015-029241 to transform the coordinates derived by omnidirectional camera CA into the coordinates of the direction from the perspective of microphone array MA.

Setting manager 39 holds first threshold th1 and second threshold th2 which are compared to sound pressure p on a per-pixel basis calculated by signal processor 33. Here, sound pressure p is used as an example of a sound parameter relating to the sound source, represents the magnitude of the sound acquired by microphone array MA, and is differentiated from the sound volume which represents the magnitude of the sound being output from speaker 37. First threshold th1 and second threshold th2 are values which are compared to the sound pressure of the sound generated in monitoring area 8, and are set to predetermined values for determining the sound emitted by pilotless flying object dn, for example. It is possible to set a plurality of thresholds, and in the exemplary embodiment, first threshold th1 and second threshold th2 which is a larger value than first threshold th1 are set, totaling two thresholds (first threshold th1<second threshold th2). In the exemplary embodiment, three or more thresholds may be set.

As described later, area R1 (refer to FIG. 15) of the pixels at which a greater sound pressure than second threshold th2 is obtained is rendered in red, for example, on monitor 50 on which the omnidirectional image data is displayed. Area B1 of the pixels at which a sound pressure which is greater than first threshold th1 and less than or equal to second threshold th2 is rendered in blue, for example, on monitor 50 on which the omnidirectional image data is displayed. Area N1 of the pixels with a sound pressure of less than or equal to first threshold th1 is rendered colorless, for example, on monitor 50 on which the omnidirectional image data is displayed, that is, is no different from the display color of the omnidirectional image data.

Transceiver 31 receives the omnidirectional image data or the cut-out video data transmitted by omnidirectional camera CA, and the audio data transmitted by microphone array MA, and outputs the received data to signal processor 33.

Console 32 is a user interface (UI) for notifying signal processor 33 of the content of an input operation of the user, and is configured by a pointing device such as a mouse and a keyboard. Console 32 may be configured using a touch panel or a touch pad disposed corresponding to the screen of monitor 50, for example, and with which direct input operation is possible through a finger or a stylus pen of the user.

Console 32 acquires the coordinate data indicating the designated position and outputs the coordinate data to signal processor 33 if the user designates red area R1 of sound pressure heat map MP (refer to FIG. 15) displayed on monitor 50. Signal processor 33 reads the audio data corresponding to the coordinate data of the designated position from memory 38, forms directional sound data in the direction toward the sound source position corresponding to the designated position from microphone array MA by emphasizing the audio data being read (hereinafter, this process is called as "directionality forming process"), and subsequently outputs the directional sound data to speaker 37. Accordingly, the user is capable of clearly recognizing in a state in which the sound at not only pilotless flying object do but also other designated positions is emphasized.

Memory 38 is configured using a ROM or a RAM. Memory 38 holds various data including audio data of a fixed term, directional sound data of a fixed term, setting information, programs, and the like, for example. Memory 38 includes pattern memory in which sound patterns which are characteristic to the individual pilotless flying objects dn are registered. Furthermore, memory 38 stores data of sound pressure heat map MP. Discrimination mark mk (refer to FIG. 13) which schematically represents the position of pilotless flying object dn is registered in memory 38. Discrimination mark mk used here is a star-shaped symbol as an example. Discrimination mark mk is not limited to a star shape, and in addition to a circle shape or a rectangle shape, may further be a symbol or character such as a fylfot which is reminiscent of a pilotless flying object. The display form of discrimination mark mk may be changed between day and night, for example, a star shape during the day, and a rectangular shape during the night so as not to be confused for a star. Discrimination mark mk may be dynamically changed. For example, a star-shaped symbol may be displayed in a blinking manner, or may be rotated, further engaging the attention of the user.

Figure 7:
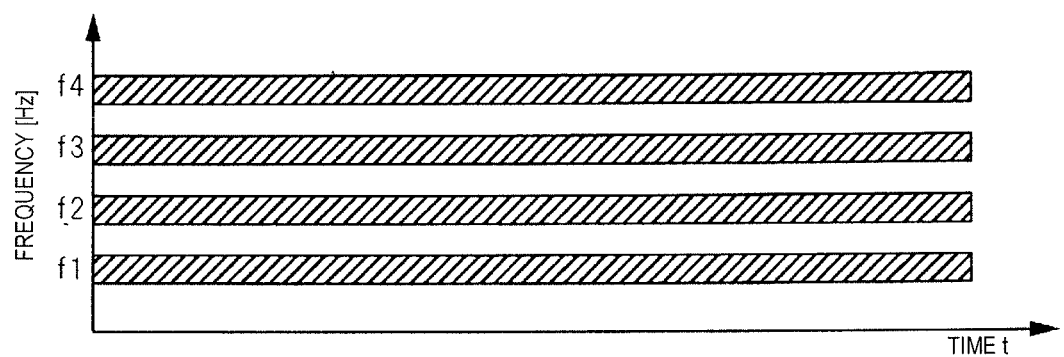
FIG. 7 is a timing chart illustrating an example of a detected sound signal pattern of a pilotless flying object registered in a memory.

FIG. 7 is a timing chart illustrating an example of a detected sound pattern of pilotless flying object dn registered in memory 38. The detected sound pattern illustrated in FIG. 7 is a combination of frequency patterns, and includes sounds of four frequencies f1, f2, f3, and f4 which are generated by the rotation of four rotors which are installed on the multi-copter pilotless flying object dn, or the like. The signals of the frequencies are signals of frequencies of different sounds which are generated in accordance with the rotation of a plurality of blades which are axially supported on each rotor, for example.

In FIG. 7, the frequency areas shaded with diagonal lines are areas with high sound pressure. The detected sound pattern may include not only the number of sounds and the sound pressure of the plurality of frequencies, but also other sound information. For example, a sound pressure rate representing the sound pressure ratio of the frequencies or the like is exemplified. Here, for example, the detection of pilotless flying object dn is determined according to whether or not the sound pressure of each frequency contained in the detected sound pattern exceeds a threshold.

Directivity processor 63 uses the sound signals (also referred to as audio data) which are acquired by the non-directional microphones M1 to Mn, performs a directionality forming process described earlier (beam forming), and performs an extraction process of the audio data in which an arbitrary direction is used as the directivity setting direction. Directivity processor 63 is also capable of performing an extraction process of the audio data in which an arbitrary direction range is used as an directivity setting area. Here, the directivity setting area is a range including a plurality of adjacent directivity setting directions, and in comparison to the directivity setting direction, is intended to include a same degree of spread in the directivity setting direction.

Frequency analyzer 64 performs frequency analysis processing on the directional sound data subjected to the extraction process in the directivity setting direction by directivity processor 63. In the frequency analysis processing, the frequency and the sound pressure thereof included in the directional sound data of the directivity setting direction are detected.

Figure 8:
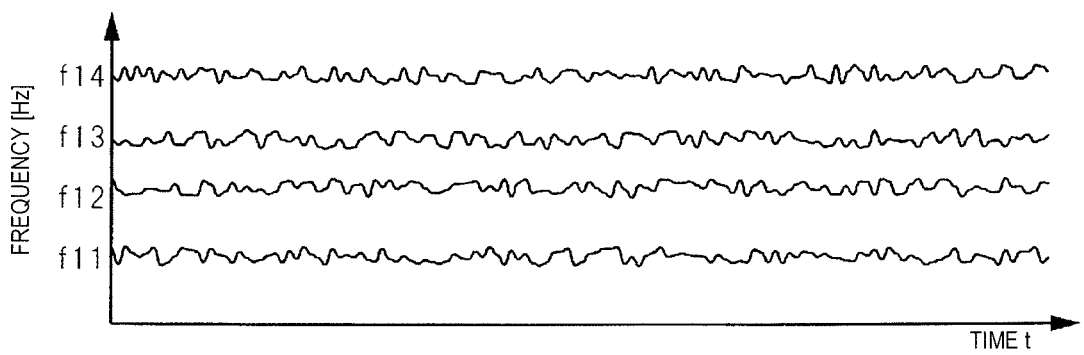
FIG. 8 is a timing chart illustrating an example of frequency variation in the detected sound signals obtained as a result of frequency analysis processing.

FIG. 8 is a timing chart illustrating an example of frequency variation in the detected sound signals obtained as a result of the frequency analysis processing. In FIG. 8, four frequencies f11, f12, f13, and f14, and the sound pressure of each frequency are obtained as the detected sound signals (that is, the detected directional sound data). In FIG. 8, the fluctuation in each frequency which changes irregularly occurs due to fluctuations in the rotation of the rotors (the rotary blades) which change slightly when pilotless flying object dn controls the posture of the body of pilotless flying object dn.

Object detector 65 performs a search and detection process of pilotless flying object dn. In the search and detection process of pilotless flying object dn, object detector 65 compares the detected sound pattern obtained as a result of the frequency analysis processing (refer to FIG. 8) (frequencies f11 to f14), to the detected sound pattern registered in advance in the pattern memory of memory 38 (refer to FIG. 7) (frequencies f1 to f4). Object detector 65 determines whether or not both of the patterns of detected sounds are similar.

Whether or not both of the patterns of detected sounds are similar is determined as follows, for example. When the sound pressures of at least two frequencies contained in the detected directional sound data of four frequencies f1, f2, f3, and f4 exceed a threshold, object detector 65 determines the sound patterns to be similar and detects pilotless flying object dn. Pilotless flying object dn may be detected When other conditions are satisfied.

When detection result determiner 66 determines that pilotless flying object dn is not present, detection result determiner 66 instructs detecting direction controller 68 to transition to detecting pilotless flying object dn in the next directivity setting direction. When detection result determiner 66 determines that pilotless flying object dn is present as a result of the scanning of the directivity setting direction, detection result determiner 66 notifies output controller 35 of the detection results of pilotless flying object dn. Information of the detected pilotless flying object dn is included in the detection results. The information of pilotless flying object dn includes identification information of pilotless flying object dn, and positional information (for example, direction information) of pilotless flying object dn in the sound acquisition area.

Detecting direction controller 68 controls the direction for detecting pilotless flying object do in the sound acquisition area based on the instructions from detection result determiner 66. For example, detecting direction controller 68 sets an arbitrary direction of directivity setting area BF1 which contains the sound source position estimated by sound source direction detector 34 in the entirety of the sound acquisition area as the detection direction.

Scanning controller 67 instructs directivity processor 63 to perform beam forming using the detection direction being set by detecting direction controller 68 as the directivity setting direction.

Directivity processor 63 performs beam forming on the directivity setting direction instructed from scanning controller 67. In the initial settings, directivity processor 63 uses the initial position in directivity setting area BF1 (refer to FIG. 11) which includes a position estimated by sound source direction detector 34 as directivity setting direction BF2. Directivity setting direction BF2 is set successively from within directivity setting area BF1 by detecting direction controller 68.

Output controller 35 calculates the sound pressure on a per-pixel basis using the individual pixels which form the omnidirectional image data based on the omnidirectional image data captured by omnidirectional camera CA and the audio data acquired by microphone array MA. The calculation process of the sound pressure is well-known technology, and thus detailed description thereof will be omitted. Accordingly, output controller 35 generates sound pressure heat map MP in which a calculated value of the sound pressure is allocated to the position of a pixel on a per-pixel basis using the individual pixels which form the omnidirectional image data. Furthermore, output controller 35 generates sound pressure heat map MP such as that illustrated in FIG. 15 by performing a color transformation process on the sound pressure values on a per-pixel basis using the pixels of the generated sound pressure heat map MP.

The sound pressure heat map MP may be generated by calculating the average value of the sound pressure values in pixel block units formed of a predetermined number of (for example, four) pixels instead of calculating the sound pressure on a per-pixel basis, and allocating the average value of the sound pressure values corresponding to the corresponding predetermined number of pixels.

Output controller 35 controls the operations of monitor 50 and speaker 37, outputs the omnidirectional image data or the cut-out video data transmitted from omnidirectional camera CA to monitor 50 to be displayed, and further outputs the audio data transmitted from microphone array MA to speaker 37. When pilotless flying object dn is detected, output controller 35 outputs discrimination mark mk which represents pilotless flying object dn to monitor 50 in order to superimpose discrimination mark mk on omnidirectional image and display the result.

Output controller 35 subjects the directional sound data of the directivity setting direction to emphasis processing by using the audio data acquired by microphone array MA and the coordinates which indicate the direction of the sound source position derived by omnidirectional camera CA to perform a directionality forming process on the audio data acquired by microphone array MA. The directionality forming process of the audio data is well-known technology described in Japanese Patent Unexamined Publication No. 2015-029241, for example.

Speaker 37 outputs the audio data acquired by microphone array MA, or the directional sound data acquired by microphone array MA and for which directionality is formed by signal processor 33. Speaker 37 may be configured as a separate device from monitoring apparatus 10.

The operations of pilotless flying object detection system 5 including the configuration described above will be indicated as follows.

Figure 9:
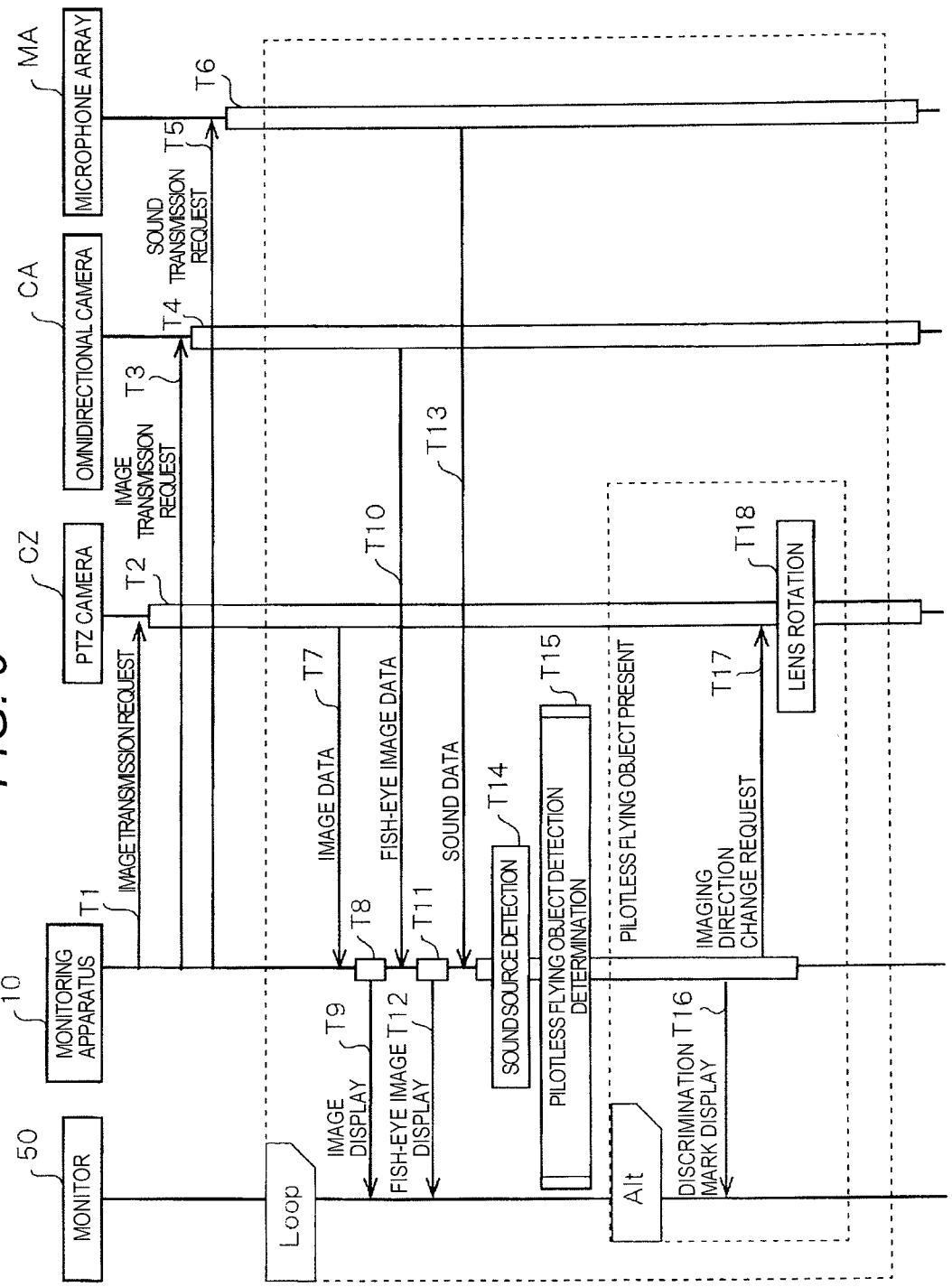
FIG. 9 is a sequence diagram illustrating an example of a detection operation of a pilotless flying object in the pilotless flying object detection system of the exemplary embodiment.

FIG. 9 is a sequence diagram illustrating an example of a detection operation of a pilotless flying object in pilotless flying object detection system 5 of the exemplary embodiment. When power is input to the devices (for example, monitor 50, monitoring apparatus 10, PTZ camera CZ, omnidirectional camera CA, and microphone array MA) of pilotless flying object detection system 5, pilotless flying object detection system 5 starts operating.

In the initialization operations, monitoring apparatus 10 performs an image transmission request in relation to PTZ camera CZ (T1). PTZ camera CZ starts the imaging process corresponding to the input of power in accordance with the request (T2). Similarly, monitoring apparatus 10 performs an image transmission request in relation to omnidirectional camera CA (T3). omnidirectional camera CA starts the imaging process corresponding to the input of power in accordance with the request (T4). Furthermore, monitoring apparatus 10 performs a sound transmission request in relation to microphone array MA (T5). Microphone array MA starts the sound acquisition process corresponding to the input of power in accordance with the request (T6).

Once the initialization operations are completed, PTZ camera CZ transmits the captured image (for example, a still image or a video) data obtained through imaging to monitoring apparatus 10 via network NW (T7). Monitoring apparatus 10 converts the captured image data transmitted from PTZ camera CZ into display data such as NTSC (T8), and outputs the display data to monitor 50 (T9). When the display data is input to monitor 50, monitor 50 displays PTZ image GZ2 (refer to FIG. 12 and the like) of PTZ camera CZ on the screen.

Similarly, omnidirectional camera CA transmits the omnidirectional image (for example, a still image or a video) data obtained through imaging to monitoring apparatus 10 via network NW (T10). Monitoring apparatus 10 converts the omnidirectional image data transmitted from omnidirectional camera CA into display data such as NTSC (T11), and outputs the display data to monitor 50 (T12). When the display data is input to monitor 50, monitor 50 displays omnidirectional image GZ1 (refer to FIG. 12 and the like) of omnidirectional camera CA on the screen.

Microphone array MA encodes the audio data of the audio obtained through acquisition and transmits the encoded audio data to monitoring apparatus 10 via network NW (T13). In monitoring apparatus 10, sound source direction detector 34 estimates the sound source position in monitoring area 8 (T14). When monitoring apparatus 10 detects pilotless flying object dn, the estimated sound source position is used as the reference position of directivity setting area BF1 which is necessary for the initial setting of the directivity setting direction.

Monitoring apparatus 10 performs detection determination of pilotless flying object dn (T15). The detection determination process of pilotless flying object dn will be described later in detail.

When pilotless flying object dn is detected as a result of the detection determination process, output controller 35 in monitoring apparatus 10 superimposes discrimination mark mk, which represents pilotless flying object dn being present in the directivity setting direction determined in procedure T15, onto omnidirectional image GZ1 displayed on the screen of monitor 50 and displays the result (T16).

Output controller 35 transmits information relating to the directivity setting direction obtained in procedure T15 to PTZ camera CZ, and performs a request for changing the imaging direction of PTZ camera CZ to the directivity setting direction (in other words, an angle of view change instruction) (T17). When PTZ camera CZ receives the information relating to the directivity setting direction (that is, the angle of view change instruction), imaging direction controller 58 drives lens actuator 59 based on the information relating to the directivity setting direction, changes optical axis L2 of the imaging lens of PTZ camera CZ, and changes the imaging direction to the directivity setting direction (T18). At the same time, imaging direction controller 58 changes the zoom ratio of the imaging lens of PTZ camera CZ to a pre-set value, a value corresponding to the proportion of the captured image occupied by pilotless flying object dn, or the like.

When pilotless flying object dn is not detected as a result of the detection determination process in procedure T15, the processes of T16, T17, and T18 are not performed.

Subsequently, the process of pilotless flying object detection system 5 returns to procedure T7, and the same processes are repeated until a predetermined event such as the power being operated to turn off, for example, is detected.

Figure 10:
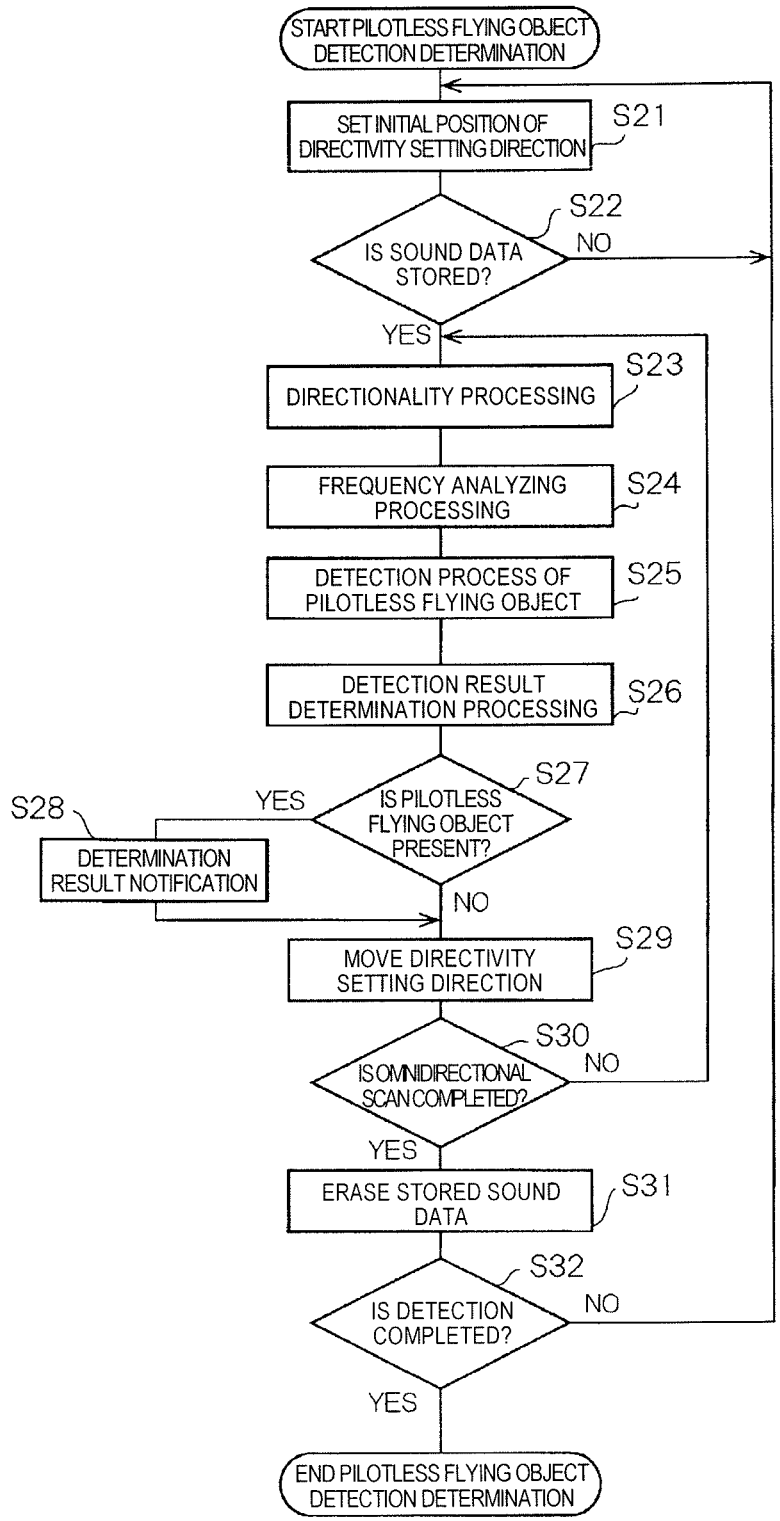
FIG. 10 is a flowchart illustrating a detailed example of a pilotless flying object detection determination procedure of procedure T15 of FIG. 9.

FIG. 10 is a flowchart illustrating a detailed example of a pilotless flying object detection determination procedure of procedure T15 of FIG. 9. In sound source detector UD, directivity processor 63 sets directivity setting area BF1 which is based on the sound source position estimated by sound source direction detector 34 as the initial position of directivity setting direction BF2 (S21).

Figure 11:
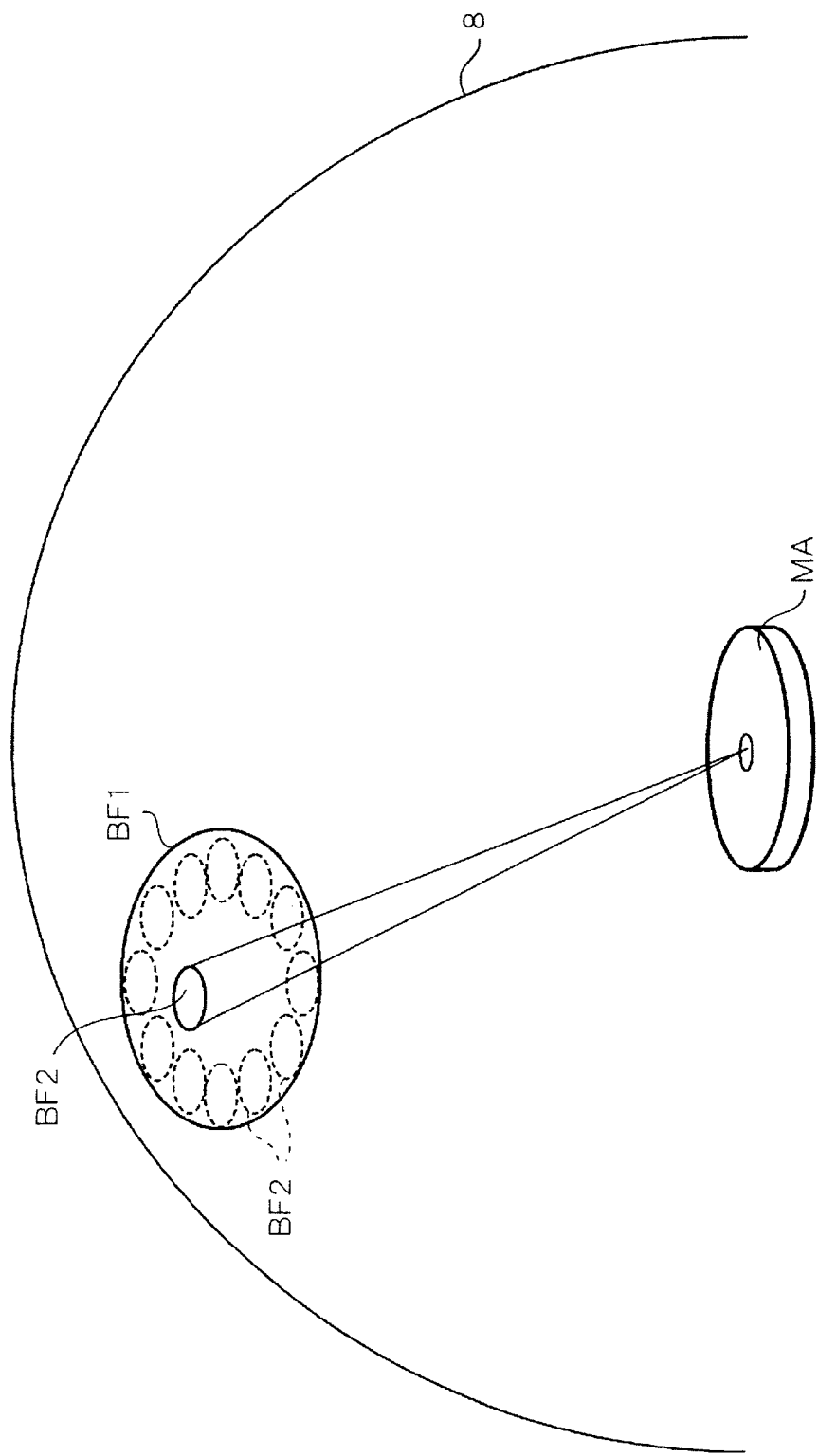
FIG. 11 is a diagram illustrating an example of a situation in which directivity setting directions in a monitoring area are sequentially scanned, and a pilotless flying object is detected.

FIG. 11 is a diagram illustrating an example of a situation in which directivity setting directions BF2 in monitoring area 8 are sequentially scanned, and pilotless flying object do is detected. The initial position is not limited to directivity setting area BF1 based on the sound source position of monitoring area 8 which is estimated by sound source direction detector 34, and an arbitrary position designated by the user may be set as the initial position, and the inside of monitoring area 8 may be sequentially scanned. Due to the initial position not being limited, even when the sound source included in directivity setting area BF1 based on the estimated sound source position is not a pilotless flying object, it becomes possible to quickly detect a pilotless flying object flying in another directivity setting direction.

Directivity processor 63 determines whether or not the audio data acquired by microphone array MA and converted to digital values by A/D converters A1 to An is stored temporarily in memory 38 (S22). When the audio data is not stored, the process of directivity processor 63 returns to procedure S21.

When the audio data acquired by microphone array MA is temporarily stored in memory 38 (YES in S22), directivity processor 63 performs beam forming on an arbitrary directivity setting direction BF2 in directivity setting area BF1 of monitoring area 8, and performs an extraction process on the audio data of directivity setting direction BF2 (as "a searching and detecting process of pilotless flying object", S23).

Frequency analyzer 64 detects the frequency and sound pressure of the directional sound data subjected to the extraction process (S24).

Object detector 65 compares the detected sound pattern registered in the pattern memory of memory 38 with the detected sound pattern obtained as a result of the frequency analysis processing and performs detection of pilotless flying object (S25).

Detection result determiner 66 notifies output controller 35 of the comparison results, and notifies detecting direction controller 68 of the detection direction transition (S26).

For example, object detector 65 compares the detected sound pattern obtained as a result of the frequency analysis processing to four frequencies f1, f2, f3, and f4 which are registered in the pattern memory of memory 38. As a result of the comparison, when the both detected sound patterns include at least two of the same frequency and the sound pressures of the frequencies are greater than first threshold th1, object detector 65 determines that the patterns of both detected sounds are similar and that pilotless flying object do is present.

Here, a case is assumed in which at least two frequencies match; however, object detector 65 may determine similarity when a single frequency matches and the sound pressure of the frequency is greater than first threshold th1.

Object detector 65 may set an allowed frequency error in relation to each frequency, and may determine whether or not there is similarity by treating frequencies within the frequency error range as the same frequency.

In addition to the comparison of frequencies and sound pressures, object detector 65 may perform determination by adding substantial matching of sound pressure ratios of the sounds of the frequencies to the determination conditions. In this case, since the determination conditions become stricter, it becomes easier for sound source detector UD to identify a detected pilotless flying object dn as the target (pilotless flying object dn) registered in advance, and it is possible to improve the detection precision of pilotless flying object dn.

Detection result determiner 66 determines whether or not pilotless flying object dn is present as a result of step S26 (S27).

When pilotless flying object dn is present, detection result determiner 66 notifies output controller 35 of the search and detection results that pilotless flying object dn is present (detection result of pilotless flying object dn) (S28).

Meanwhile, in step S27, when pilotless flying object dn is not present, scanning controller 67 causes directivity setting direction BF2 of the scanning target in monitoring area 8 to transition to the next different direction (S29). The notification of the search and detection results of pilotless flying object dn may be performed at once after the scanning of all directions is completed instead of at the timing at which the search and detection process of a single directivity setting direction is completed.

The order in which directivity setting direction BF2 is caused to transition in order in monitoring area 8 may be a spiral-shaped (cyclone-shaped) order in directivity setting area BF1 of monitoring area 8 or the entire range of monitoring area 8, for example, to transition from an outside circumference toward an inside circumference, or to transition from an inside circumference to an outside circumference.

Instead of scanning the directivity setting direction continually in a single sweep, detecting direction controller 68 may set the position in monitoring area 8 in advance and move directivity setting direction BF2 to each position in an arbitrary order. Accordingly, monitoring apparatus 10 is capable of starting the search and detection process from positions at which pilotless flying object dn easily enter, for example, and it is possible to improve the efficiency of the search and detection process.

Scanning controller 67 determines whether or not the scanning is completed in all directions in monitoring area 8 (S30). When the scanning is not completed in all directions (NO in S30), the process of directivity processor 63 returns to step S23, and the same processes are performed. In other words, directivity processor 63 performs beam forming in directivity setting direction BF2 of the position moved in step S29, and subjects the directional sound data of directivity setting direction BF2 to an extraction process. Accordingly, since even if a single pilotless flying object dn is detected, the detection of pilotless flying objects dn which may also be present is continued, sound source detector UD is capable of detecting a plurality of pilotless flying objects dn.

Meanwhile, when the scanning is completed in all directions in step S30 (YES in S30), directivity processor 63 erases the audio data and the directional sound data which is temporarily stored in memory 38 and is acquired by microphone array MA (S31).

After the erasing of the audio data and the directional sound data, signal processor 33 determines whether or not the search and detection process of pilotless flying objects dn is completed (S32). The completion of the search and detection process of pilotless flying objects dn is performed in accordance with a predetermined event. For example, in step S6, the number of times pilotless flying object dn was not detected is held in memory 38, and when the number of times is greater than or equal to a predetermined number, the search and detection process of pilotless flying objects dn may be completed. Signal processor 33 may complete the search and detection process of pilotless flying object dn based on a time expiration of a timer, or user operation of a user interface (UI) included in console 32. The search and detection process may be completed when the power of monitoring apparatus 10 is turned off.

In the process of step S24, frequency analyzer 64 analyses the frequency and measures the sound pressure of the frequency. Detection result determiner 66 may determine that pilotless flying object dn is approaching sound source detector UD when the sound pressure level measured by frequency analyzer 64 gradually increases with the passage of time.

For example, when the sound pressure level of a predetermined frequency measured at time t11 is smaller than the sound pressure level of the same frequency measured at time t12 later than t11, the sound pressure is increasing with the passage of time, and pilotless flying object dn may be determined as approaching. The sound pressure level may be measured over three or more times, and pilotless flying object dn may be determined as approaching based on the transition of a statistical value (for example, a variance value, an average value, a maximum value, a minimum value, or the like).

When the measured sound pressure level is greater than third threshold th3, which is a warning level, detection result determiner 66 may determine that pilotless flying object dn entered a warning area.

Third threshold th3 is a greater value than second threshold th2, for example. The warning area is the same area as monitoring area 8, or is an area contained in monitoring area 8 and is narrower than monitoring area 8, for example. The warning area is an area for which invasion of pilotless flying objects dn is restricted, for example. The approach determination and the invasion determination of pilotless flying objects dn may be executed by detection result determiner 66.

Figure 12:
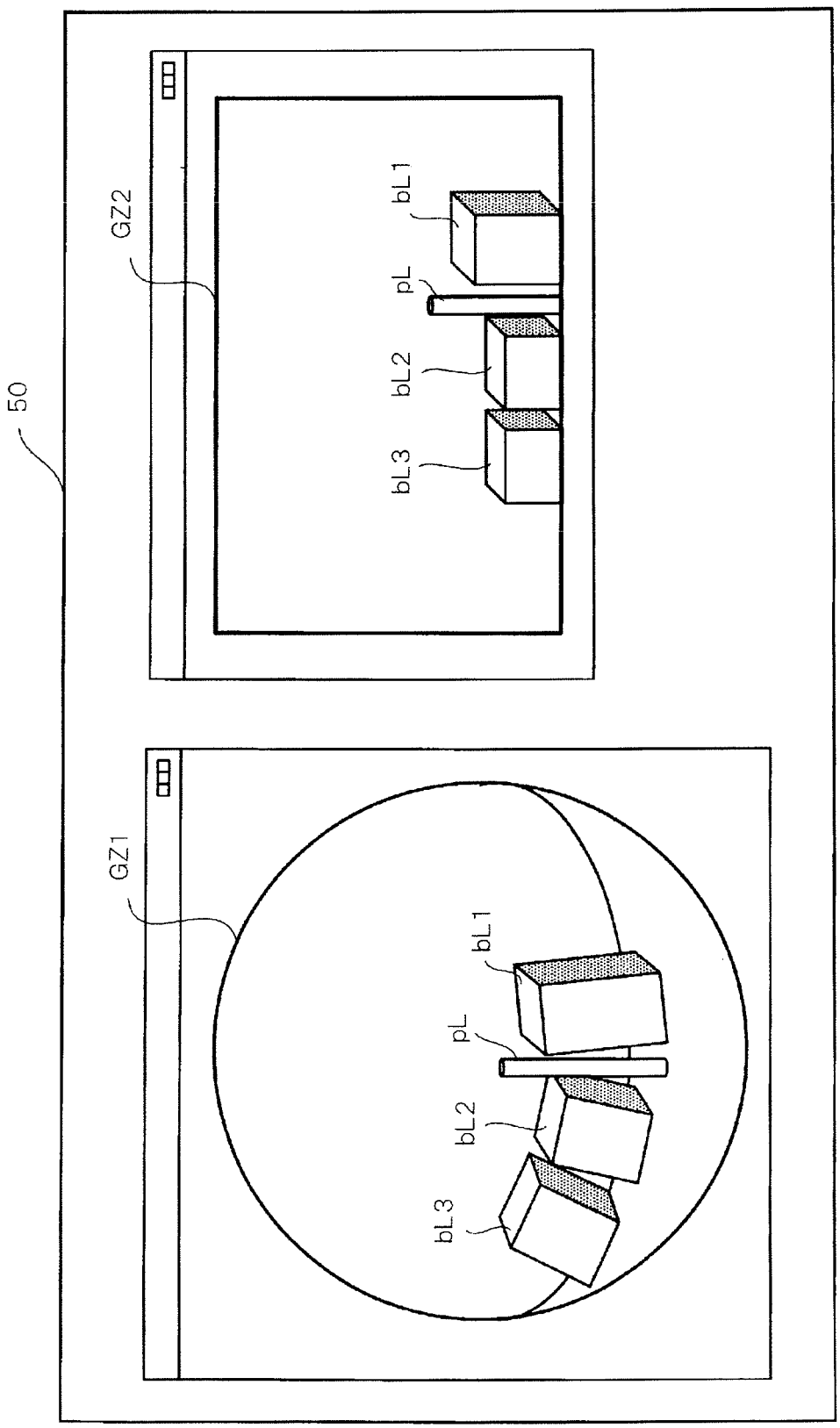
FIG. 12 is a diagram illustrating an example of a display screen of a monitor when a pilotless flying object is not detected.

FIG. 12 is a diagram illustrating an example of a display screen of monitor 50 when pilotless flying object dn is not detected. Omnidirectional image GZ1 of omnidirectional camera CA and PTZ image GZ2 of PTZ camera CZ are displayed comparatively on the display screen of monitor 50. Although three buildings bL1, bL2, and bL3, and smoke stack pL are visible in omnidirectional image GZ1, pilotless flying object dn is not visible. Here, omnidirectional image GZ1 and PTZ image GZ2 are displayed comparatively; however, one or the other may be selected and displayed, or both images may be displayed switching one for the other on a per-fixed-time basis.

Figure 13:
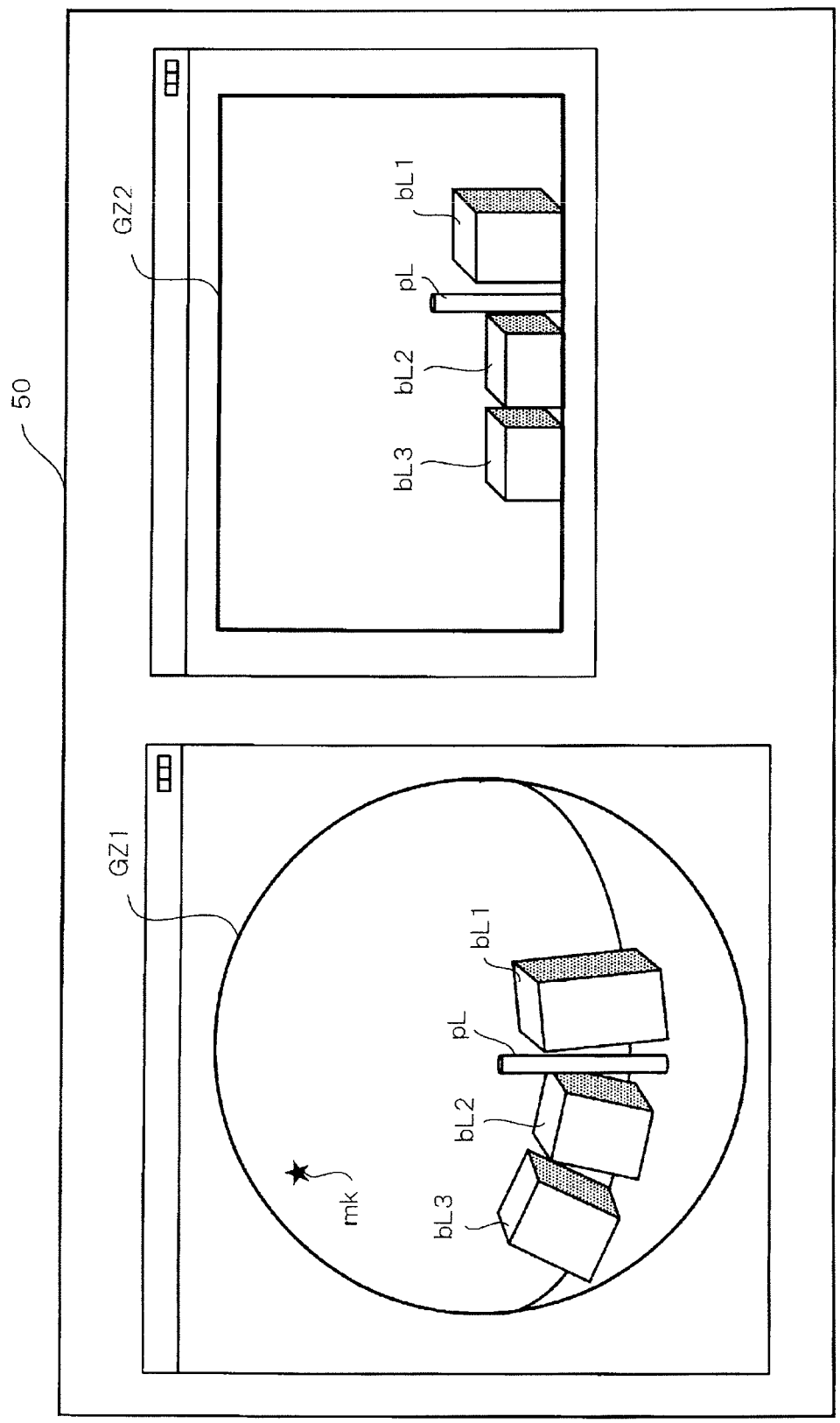
FIG. 13 is a diagram illustrating an example of a display screen of the monitor when a pilotless flying object is detected.

FIG. 13 is a diagram illustrating an example of a display screen of monitor 50 when pilotless flying object dn is detected. In addition to three buildings bL1, bL2, and bL3, and smoke stack pL, discrimination mark mk which represents pilotless flying object dn which flies in the sky above three buildings bL1, bL2, and bL3, and smoke stack pL is rendered as a star-shaped symbol in omnidirectional image GZ1 of omnidirectional camera CA displayed on the display screen of monitor 50. Meanwhile, although three buildings bL1, bL2, and bL3, and smoke stack pL are still visible in PTZ image GZ2 of PTZ camera CZ, pilotless flying object dn is not visible. In other words, in FIG. 13, PTZ image GZ2 is displayed in a state before monitoring apparatus 10 causes discrimination mark mk to be displayed in procedure T16 of FIG. 9, subsequently requests the imaging direction of PTZ camera CZ in procedure T17, and further, rotates the imaging lens of PTZ camera CZ to change the optical axis direction thereof in procedure T18.

Figure 14:
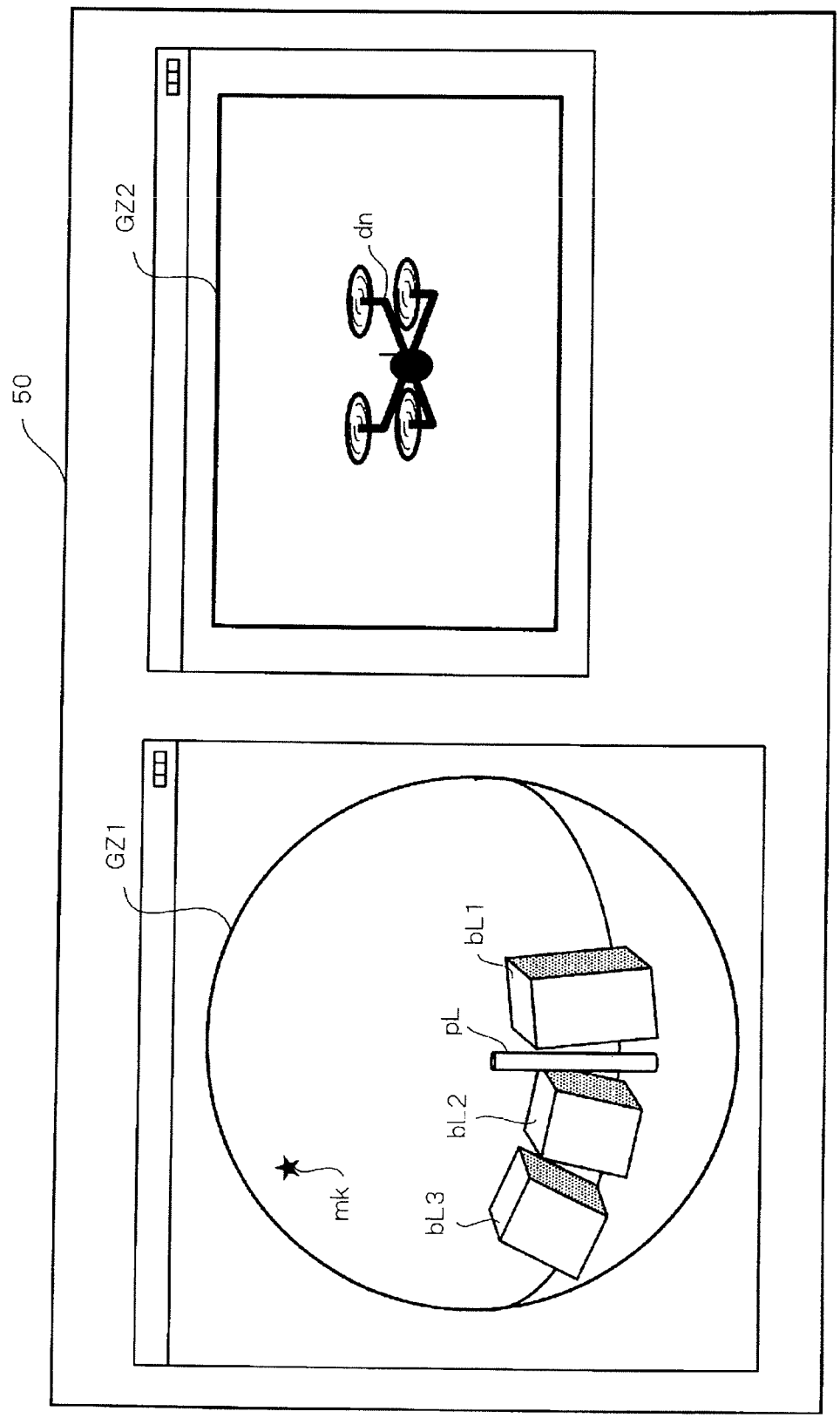
FIG. 14 is a diagram illustrating an example of a display screen of the monitor when a pilotless flying object is detected and an optical axis direction of a PTZ camera is changed in accordance with the detection.

FIG. 14 is a diagram illustrating an example of a display screen of monitor 50 when pilotless flying object dn is detected and the optical axis direction of PTZ camera CZ is changed in accordance with the detection. PTZ image GZ2 of PTZ camera CZ is a close-up image of pilotless flying object dn. Three buildings bL1, bL2, and bL3, and smoke stack pL are excluded from the angle of view and are no longer visible in PTZ image GZ2, and a close-up of pilotless flying object dn is visible.

In other words, PTZ image GZ2 is displayed in FIG. 14 in a state after monitoring apparatus 10 rotates the imaging lens of PTZ camera CZ to change the optical axis direction thereof in procedure T18 of FIG. 9, and further, causes PTZ camera CZ to zoom in.

Here, discrimination mark mk is superimposed on omnidirectional image GZ1 captured by omnidirectional camera CA, and pilotless flying object dn is visible as it is in PTZ image GZ2 captured by PTZ camera CZ. A reason for this is that even if an image of pilotless flying object dn is displayed as it is in omnidirectional image GZ1, it is difficult to distinguish pilotless flying object dn. Meanwhile, since PTZ image GZ2 captured by PTZ camera CZ is a close-up image, acquire an image of pilotless flying object dn is displayed on the display screen, pilotless flying object dn is clearly depicted. Therefore, it becomes possible to identify the model of pilotless flying object dn from the external shape of pilotless flying object dn which is clearly depicted. In this manner, sound source detector UD is capable of appropriately displaying pilotless flying object dn in consideration of the visibility of the image depicted on the display screen of monitor 50.

Omnidirectional image GZ1 may depict pilotless flying object dn as it is without displaying discrimination mark mk, and discrimination mark mk may be superimposed and displayed in PTZ image GZ2 such that omnidirectional image GZ1 and PTZ image GZ2 assume similar displays or different displays.

Figure 15:
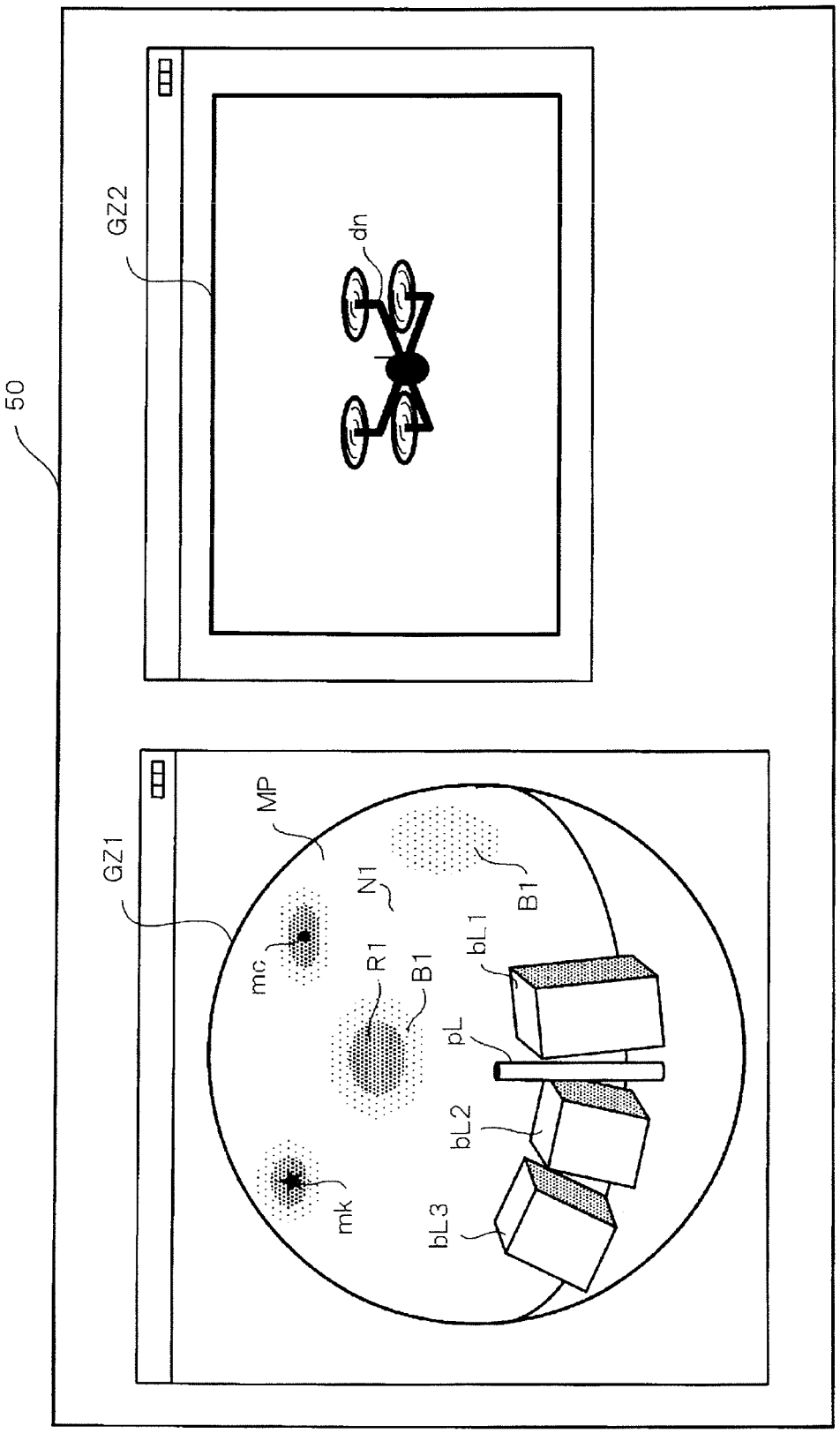
FIG. 15 is a diagram illustrating another example of a display screen of the monitor when a pilotless flying object is detected and the optical axis direction of the PTZ camera is changed in accordance with the detection.

FIG. 15 is a diagram illustrating another example of a display screen of monitor 50 when pilotless flying object dn is detected and the optical axis direction of PTZ camera CZ is changed in accordance with the detection. The display screen of monitor 50 illustrated in FIG. 15 is displayed due to the user inputting an instruction to a display menu of another mode via console 32 of monitoring apparatus 10, for example. In the display screen of FIG. 15, the calculated values of the sound pressure, which are calculated on a per-pixel basis using the pixels which form the omnidirectional image data, indicate that another sound source which is equivalent to the sound pressure values of pilotless flying object dn is present. In addition to discrimination mark mk which represents pilotless flying object dn, out-of-discrimination mark mc which represents another sound source (that is, an object is identified not to be a pilotless flying object) is superimposed on omnidirectional image GZ1. It is desirable that out-of-discrimination mark mc is rendered in a different display mode from discrimination mark mk, and in FIG. 15, is rendered as a circle symbol. Examples of other display modes include an ellipse, a triangle, a symbol such as a question mark, and text. Out-of-discrimination mark mc may be dynamically displayed in the same manner as discrimination mark mk.

Furthermore, a sound pressure heat map representing the per-pixel sound pressure is generated by output controller 35, and sound pressure heat map MP obtained by subjecting areas in which the calculated value of sound pressure exceeds a threshold to a color transformation process is overlaid on omnidirectional image GZ1. Here, in sound pressure heat map MP, area R1 in which the sound pressure exceeds second threshold th2 is rendered in red (the large dot group in FIG. 15), and area B1 in which the sound pressure is greater than first threshold th1 and less than or equal to second threshold th2 is rendered in blue (the small dot group in FIG. 15). Area N1 in which the sound pressure is less than or equal to first threshold th1 is rendered transparent (nothing displayed in FIG. 15).

Due to out-of-discrimination mark mc which represents the position of another sound source being rendered on the same omnidirectional image GZ1 as discrimination mark mk which represents pilotless flying object dn, and sound pressure heat map MP being rendered, it becomes possible to more clearly understand the peripheral state surrounding pilotless flying object dn. For example, when a sound source is yet to be registered as pilotless flying object dn is flying, the user designates the position of the sound source represented by out-of-discrimination mark mc, which is another discrimination mark, on the display screen of monitor 50, or alternatively designates red area R1 of sound pressure heat map MP. Accordingly, since output controller 35 of monitoring apparatus 10 is capable of causing PTZ camera CZ to zoom in on the position of the sound source or red area R1 to acquire the post-zoom PTZ image GZ2, and depict PTZ image GZ2 on monitor 50, it is possible to swiftly and accurately confirm the unconfirmed sound source. Accordingly, even if an unregistered pilotless flying object dn is hypothetically present, the user becomes capable of detecting pilotless flying object dn.

A display mode in which only out-of-discrimination mark mc is rendered on the same omnidirectional image GZ1 as discrimination mark mk, or a display mode in which only sound pressure heat map MP is rendered may be adopted. The user is capable of arbitrarily selecting the display mode of the display screens.

According to the description hereunto, in pilotless flying object detection system 5 of the exemplary embodiment, omnidirectional camera CA images monitoring area 8 (the imaging area). Microphone array MA acquires the audio of monitoring area 8. Monitoring apparatus 10 uses the audio data acquired by microphone array MA to detect pilotless flying object dn which appears in monitoring area 8. Signal processor 33 in monitoring apparatus 10 superimposes discrimination mark mk (the first identification information), which is obtained by converting pilotless flying object dn into visual information in the captured image (that is, omnidirectional image GZ1) of omnidirectional camera CA, on omnidirectional image GZ1 of monitoring area 8, and displays the result on monitor 50. Accordingly, pilotless flying object detection system 5 is capable of using omnidirectional image GZ1, captured by omnidirectional camera CA, to swiftly and accurately determine the presence and position of the target pilotless flying object dn.

In pilotless flying object detection system 5, PTZ camera CZ which is capable of adjusting the optical axis direction images monitoring area 8. Signal processor 33 outputs an instruction for adjusting the optical axis direction to the direction corresponding to the detection results of pilotless flying object dn to PTZ camera CZ. Monitor 50 displays an image (that is, PTZ image GZ2) captured by PTZ camera CZ, the optical axis direction of which is adjusted based on the instruction. Accordingly, pilotless flying object detection system 5 is capable of allowing a surveillant, who is the user, to clearly recognize and identify the accurate model of pilotless flying object dn from an image of pilotless flying object dn captured by PTZ camera CZ and is not distorted.

Monitor 50 comparatively displays omnidirectional image GZ1 of omnidirectional camera CA in which discrimination mark mk of pilotless flying object dn is included, and captured image (that is, PTZ image GZ2) of PTZ camera CZ. Accordingly, the surveillant who is the user is capable of accurately ascertaining the model of pilotless flying object dn and the peripheral state in which pilotless flying object dn is present by alternately viewing and comparing omnidirectional image GZ1 and PTZ image GZ2, for example.

Signal processor 33 detects at least one other sound source of monitoring area 8, and displays the other sound source on monitor 50 as out-of-discrimination mark mc (the second identification information) which is obtained by converting the other sound source into visual information in the captured image of omnidirectional camera CA, and which is different from discrimination mark mk. Accordingly, the surveillant who is a user is capable of ascertaining the unconfirmed sound source which is not the target pilotless flying object dn. The user is capable of accurately confirming whether or not the unconfirmed sound source is an unregistered pilotless flying object.

Signal processor 33 calculates the per-pixel sound pressure values in the captured image of monitoring area 8, superimposes the per-pixel sound pressure values in the captured image on the omnidirectional image data of the imaging area in a manner in which the per-pixel sound pressure values can be identified by a plurality of different color gradients depending on the per-pixel sound pressure value as sound pressure heat map MP, and displays the result on monitor 50. Accordingly, the user is capable of comparatively viewing the sound pressure of sounds emitted by pilotless flying object dn and the sound pressure of the periphery, and it becomes possible to relatively and visually ascertain the sound pressure of a pilotless flying object.

Hereunto description is given of an exemplary embodiment with reference to the drawings, and it goes without saying that the disclosure is not limited to the examples given. It is clear to a person skilled in the art that various modifications and corrections may be made within the scope disclosed in the claims. Naturally, such modifications and corrections are understood to fall within the technical scope of the disclosure.

What is claimed is:

1. An object detection system, comprising:
   a first camera of a first type;
   a second camera of a second type, the second type being different than the first type, the first camera and the second camera being disposed on a same plane;
   a microphone array;
   a display;
   a processor; and
   a memory including instructions that, when executed by the processor, cause the processor to perform operations including:
      imaging an imaging area by the first camera,
      displaying, on a display, a first captured image of the imaging area imaged by the first camera,
      acquiring audio of the imaging area by the microphone array,
      calculating per-pixel or per-block of pixels sound pressure values in the first captured image of the imaging area, in which the per-block of pixels is formed of a predetermined number of pixels,
      superimposing a sound pressure heat map in which a calculated per-pixel or per-block of pixels sound pressure value exceeds a pre-determined threshold on the first captured image of the imaging area as an audio source area by performing a transformation process,
      detecting whether or not the object is present in the audio source area from data of the audio acquired by the microphone array, and
      in a case that the object is detected in the audio source area:
         imaging the audio source area by the second camera;
         superimposing first visual identification information of the object onto a detected position of the object in the audio source area of the first captured image of the imaging area; and
         displaying, on the display, a second captured image of the audio source area imaged by the second camera.

2. The object detection system of claim 1, the operations further including:
   calculating a direction of audio of the object in the imaging area, and
   converting the direction of the audio of the object in the imaging area into position information of the object on the first captured image of the imaging area.

3. The object detection system of claim 1, the operations further including:
   emphasizing a direction of the audio acquired of the imaging area, and
   scanning the direction of the audio acquired of the imaging area.

4. The object detection system of claim 1,
   wherein the second camera is capable of adjusting an optical axis direction, and
   the operations further include:
      adjusting the optical axis direction of the second camera to a detection direction of the object.

5. The object detection system of claim 4,
   wherein the second camera captures the second captured image in the detection direction of the object.

6. The object detection system of claim 5, the operations further including:
   comparatively displaying, on the display, the first captured image of the imaging area imaged by the first camera, in which the first visual identification information is included, and the second captured image in the detection direction of the object imaged by the second camera.

7. The object detection system of claim 4,
   wherein an interval between a center of the first camera and a center of the second camera is predetermined.

8. The object detection system of claim 7,
   wherein the interval between the center of the first camera and the center of the second camera is adjustable.

9. The object detection system of claim 7, the operations further including:
   calculating a direction of audio of the object in the imaging area, and
   calculating position information of the object on the first captured image of the imaging area based on the direction of the audio of the object in the imaging area and the interval between the center of the first camera and the center of the second camera.

10. The object detection system of claim 4, the operations further including:
    emphasizing a direction of the audio acquired of the imaging area, and
    scanning the direction of the audio acquired of the imaging area.

11. The object detection system of claim 4,
    wherein the first camera is an omnidirectional camera, and the second camera is a pan tilt zoom (PTZ) camera.

12. The object detection system of claim 11,
wherein an optical axis of the omnidirectional camera and a center axis of the microphone array are aligned.

13. The object detection system of claim 11,
wherein an interval between a center of the omnidirectional camera and a center of the PTZ camera is predetermined.

14. The object detection system of claim 13,
wherein the interval between the center of the omnidirectional camera and the center of the PTZ camera is adjustable.

15. The object detection system of claim 14,
wherein the center of the omnidirectional camera is aligned with an optical axis of the omnidirectional camera, and the center of the PTZ camera is aligned with an optical axis of the PTZ camera in a state of initial setting.

16. The object detection system of claim 15,
wherein the optical axis of the PTZ camera in the state of initial setting is parallel with the optical axis of the omnidirectional camera.

17. The object detection system of claim 15, the operations further including:
calculating a direction of audio of the object in the imaging area, and
calculating position information of the object on the first captured image of the imaging area based on the direction of the audio of the object in the imaging area and the interval between the optical axis of the PTZ camera in the state of initial setting and the optical axis of the omnidirectional camera.

18. The object detection system of claim 15, the operations further including:
emphasizing a direction of the audio acquired of the imaging area, and
scanning the direction of the audio acquired of the imaging area.

19. The object detection system of claim 1, the operations further including:
detecting at least one other audio source of the imaging area,
calculating other position information of the other audio source on the first captured image of the imaging area,
converting the other position information of the other audio source into second visual identification information, different from the first visual identification information, in the first captured image of the imaging area, and
superimposing the second visual identification information on the first captured image of the imaging area.

20. The object detection system of claim 1,
wherein the sound pressure heat map is identified by a plurality of different color gradients depending on the per-pixel sound pressure values.

21. The object detection system of claim 1,
wherein the object is a pilotless flying object.

22. An object detection method for an object detection system, the object detection method comprising:
imaging an imaging area by a first camera, the first camera being of a first type;
displaying, on a display, a captured image of the imaging area imaged by the first camera,
acquiring audio of the imaging area by a microphone array,
calculating per-pixel or per-block of pixels sound pressure values in the captured image of the imaging area, in which the per-block of pixels is formed of a predetermined number of pixels,
superimposing a sound pressure heat map in which a calculated per-pixel or per-block of pixels sound pressure value exceeds a pre-determined threshold on the captured image of the imaging area as an audio source area by performing a transformation process,
detecting whether or not the object is present in the audio source area from data of the audio acquired by the microphone array, and
in a case that the object is detected in the audio source area:
imaging the audio source area by a second camera, the second camera being of a second type, the second type being different than the first type of the first camera, the first camera and the second camera being disposed on a same plane; and
superimposing first visual identification information of the object onto a detected position of the object in the audio source area of the captured image of the imaging area; and
displaying, on the display, an image of the audio source area imaged by the second camera.

23. The object detection system of claim 1, wherein the second camera is movable relative to the first camera in a predetermined direction along the same plane.

* * * * *